United States Patent
Harb et al.

(10) Patent No.: US 11,936,941 B2
(45) Date of Patent: Mar. 19, 2024

(54) DYNAMICALLY GENERATING AND HIGHLIGHTING REFERENCES TO CONTENT SEGMENTS IN VIDEOS RELATED TO A MAIN VIDEO THAT IS BEING WATCHED

(71) Applicant: Rovi Guides, Inc., San Jose, CA (US)

(72) Inventors: Reda Harb, Bellevue, WA (US); Charishma Chundi, Andhra Pradesh (IN)

(73) Assignee: Rovi Guides, Inc., San Jose, CA (US)

( * ) Notice: Subject to any disclaimer, the term of this patent is extended or adjusted under 35 U.S.C. 154(b) by 15 days.

(21) Appl. No.: 17/508,607

(22) Filed: Oct. 22, 2021

(65) Prior Publication Data

US 2023/0129286 A1    Apr. 27, 2023

(51) Int. Cl.
H04N 21/44    (2011.01)
H04N 21/462    (2011.01)

(52) U.S. Cl.
CPC ........... *H04N 21/44* (2013.01); *H04N 21/462* (2013.01)

(58) Field of Classification Search
CPC .............................. H04N 21/44; H04N 21/462
See application file for complete search history.

(56) References Cited

U.S. PATENT DOCUMENTS

| | | | |
|---|---|---|---|
| 9,003,288 B2 | 4/2015 | Clarke-Martin et al. | |
| 9,462,344 B1* | 10/2016 | Sheedy | H04N 21/47202 |
| 9,563,704 B1 | 2/2017 | Greene et al. | |
| 10,200,434 B1 | 2/2019 | Wells | |
| 10,225,625 B2* | 3/2019 | Homyack | H04N 5/445 |
| 10,467,287 B2 | 11/2019 | Hume et al. | |
| 10,779,058 B2 | 9/2020 | Panchaksharaiah et al. | |
| 10,863,211 B1* | 12/2020 | Wu | H04N 21/236 |
| 2008/0235259 A1* | 9/2008 | Abernethy, Jr. | G06F 16/40 |
| | | | 707/999.102 |
| 2008/0253737 A1 | 10/2008 | Kimura et al. | |
| 2008/0276266 A1 | 11/2008 | Huchital et al. | |
| 2010/0066904 A1 | 3/2010 | Schindler et al. | |
| 2010/0241961 A1 | 9/2010 | Peterson et al. | |
| 2011/0265113 A1 | 10/2011 | Apfel et al. | |
| 2013/0251338 A1 | 9/2013 | Abecassis | |
| 2013/0347038 A1 | 12/2013 | Lee | |
| 2014/0072275 A1 | 3/2014 | Nagasaka et al. | |
| 2014/0223475 A1 | 8/2014 | McIntire et al. | |
| 2014/0258472 A1* | 9/2014 | Shirey | H04L 65/762 |
| | | | 709/219 |

(Continued)

*Primary Examiner* — Sumaiya A Chowdhury
(74) *Attorney, Agent, or Firm* — HALEY GUILIANO LLP

(57) ABSTRACT

Systems and methods are provided for identifying related media content items. First media content item is outputted on a device. A user interface input requesting media content related to the first media content item is received. Metadata is accessed for a portion of the first media content item within a predetermined time period away from a pause position of the first media content item to identify topic keyword. An offer to interrupt the first media content item to output content related to the topic keyword is displayed. In response to offer's acceptance, a portion of an identified related media content item that is associated with the identified topic keyword is identified. The portion of the identified related media content item is transmitted for display while the media content is paused. The device then resumes displaying the media content item.

18 Claims, 21 Drawing Sheets

(56) References Cited

U.S. PATENT DOCUMENTS

| | | |
|---|---|---|
| 2015/0026728 A1 | 1/2015 | Carter et al. |
| 2015/0113013 A1 | 4/2015 | Rys et al. |
| 2016/0112762 A1 | 4/2016 | Mallinson |
| 2017/0019719 A1 | 1/2017 | Neumeier et al. |
| 2018/0184049 A1 | 6/2018 | Moss et al. |
| 2019/0075371 A1* | 3/2019 | Parampath ....... H04N 21/26241 |
| 2019/0342599 A1 | 11/2019 | Almeida et al. |
| 2020/0099976 A1 | 3/2020 | Nasir et al. |
| 2020/0162798 A1 | 5/2020 | Khan et al. |
| 2023/0126537 A1 | 4/2023 | Harb et al. |

* cited by examiner

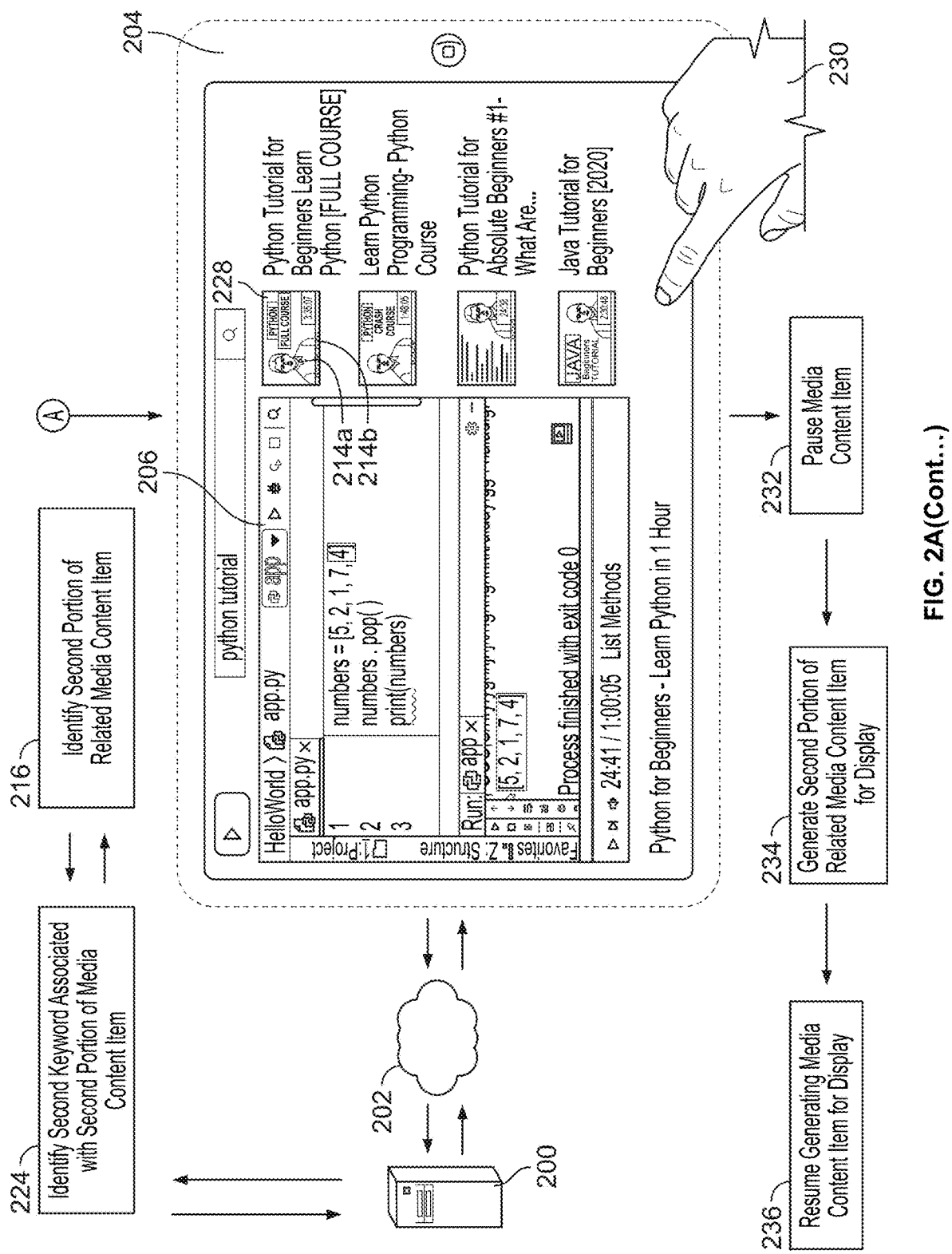
FIG. 2A(Cont...)

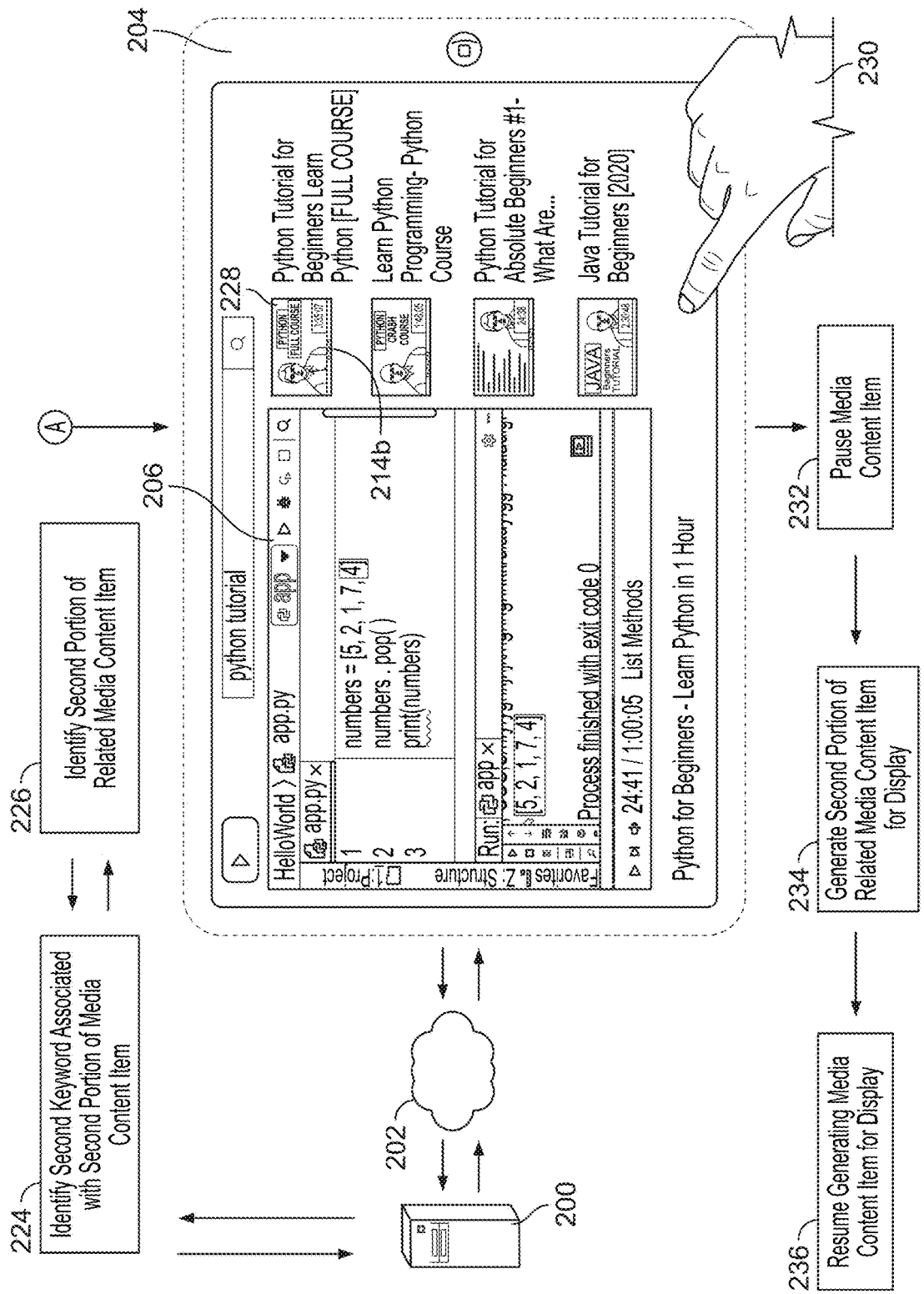
FIG. 2B(Cont...)

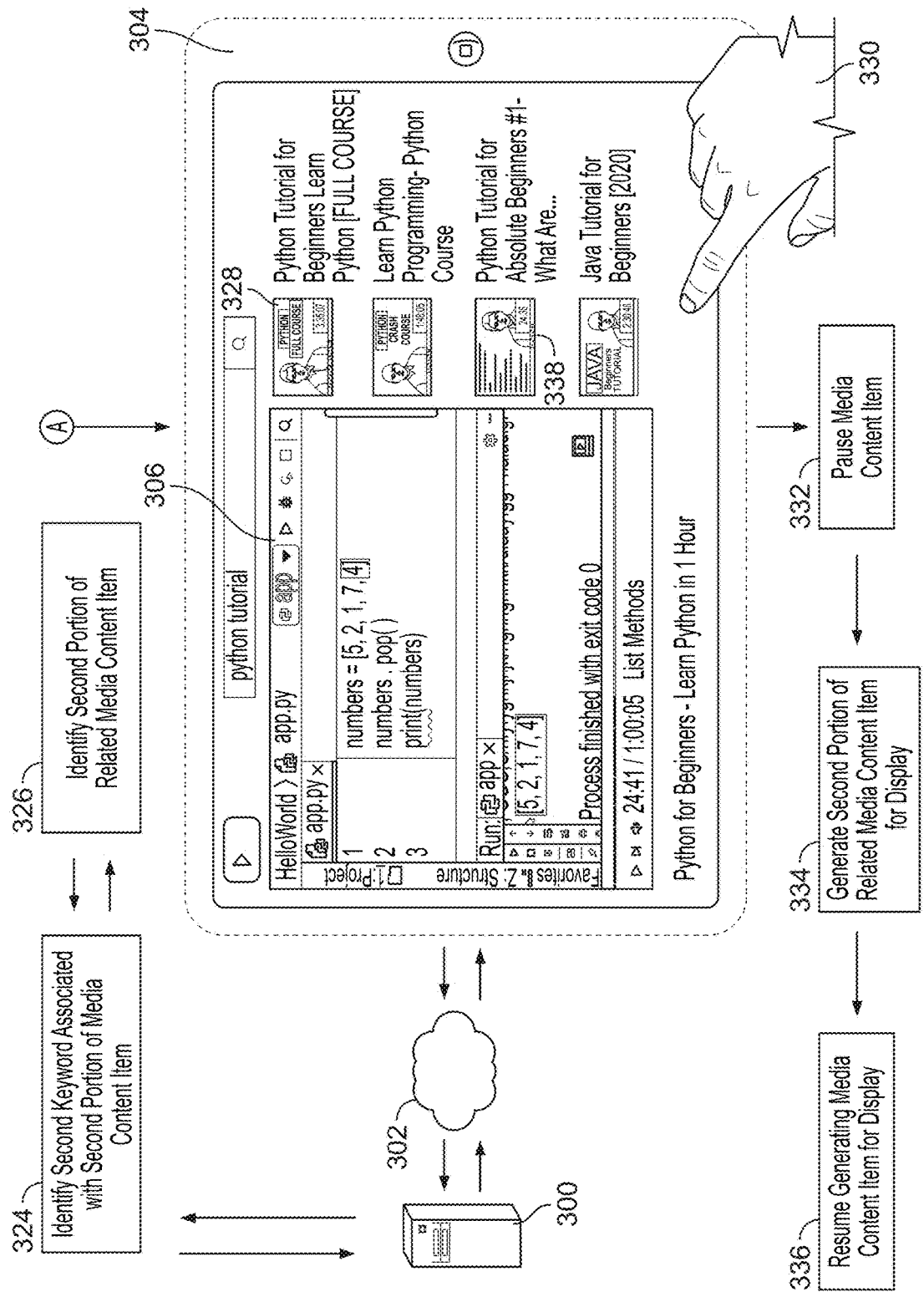
FIG. 3(Cont...)

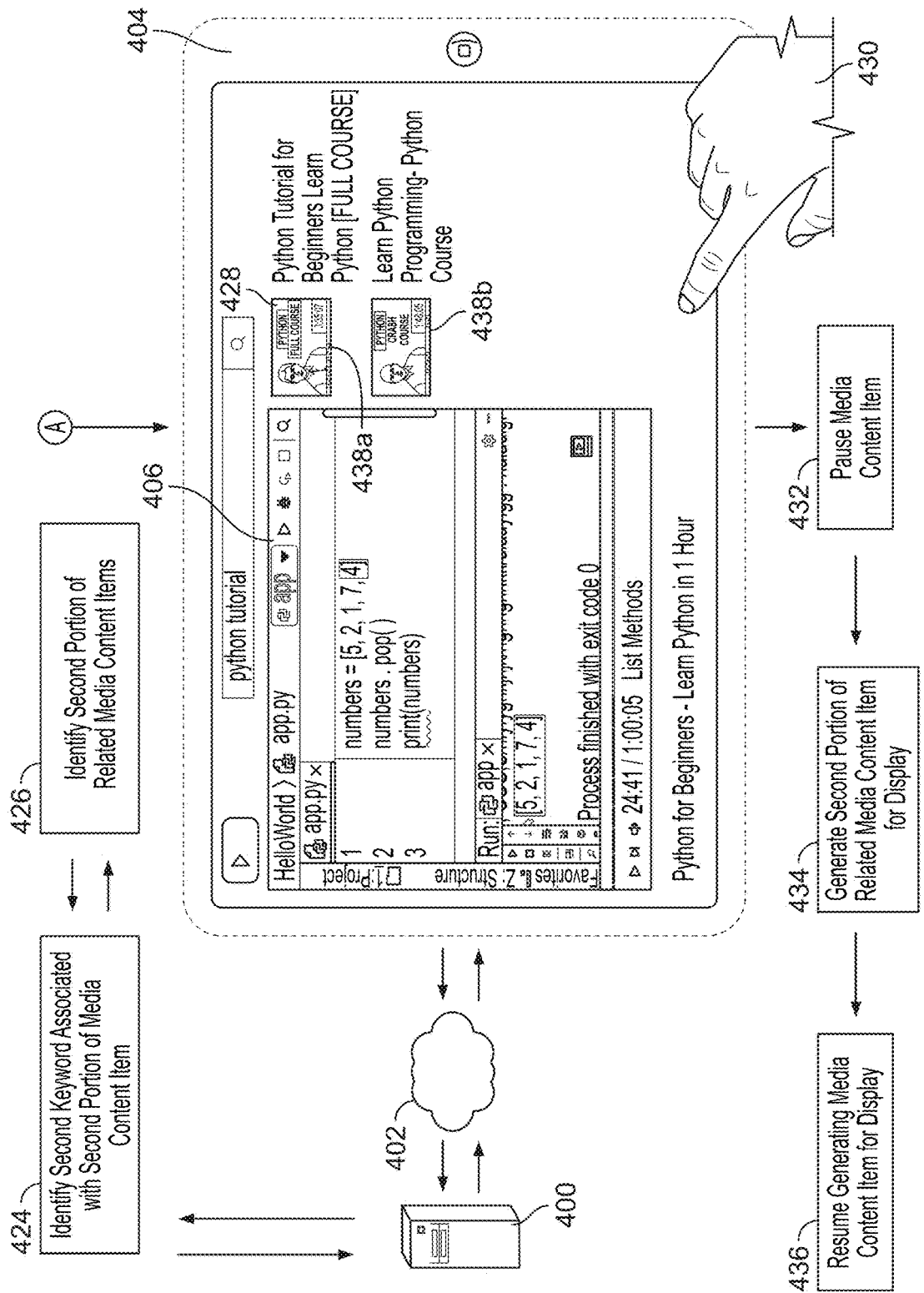
FIG. 4(Cont...)

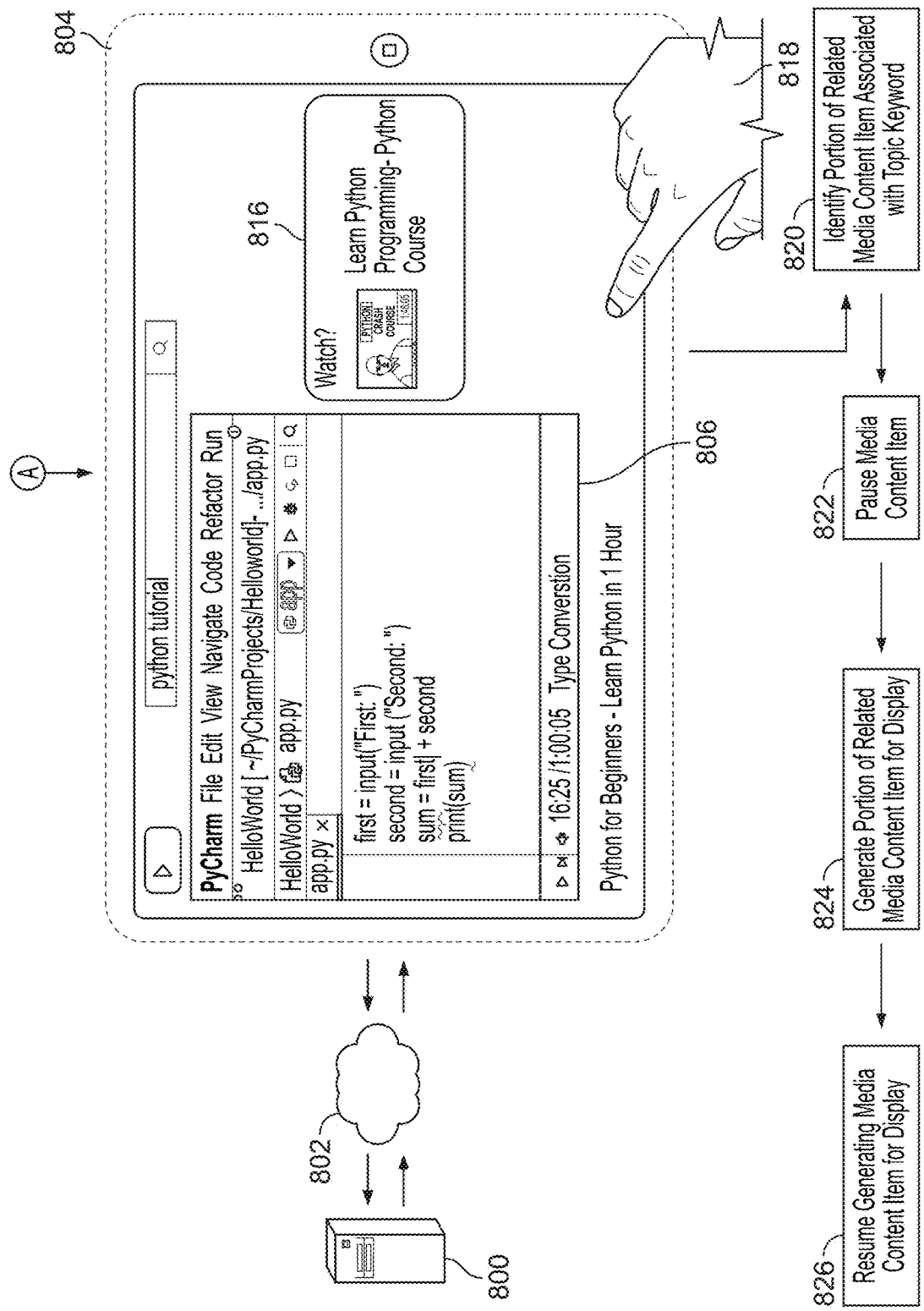
FIG. 8A(Cont...)

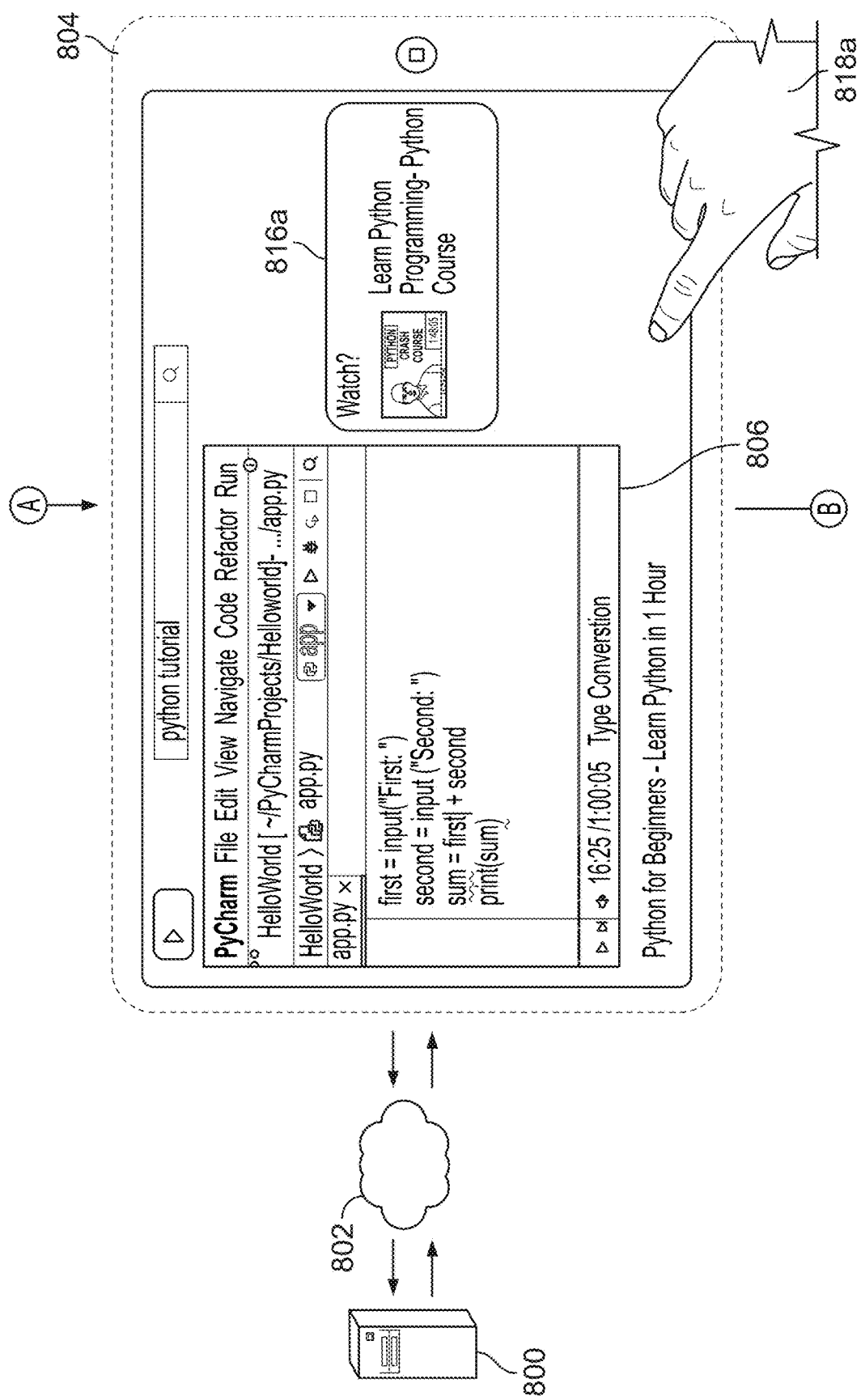
FIG. 8B(Cont...)

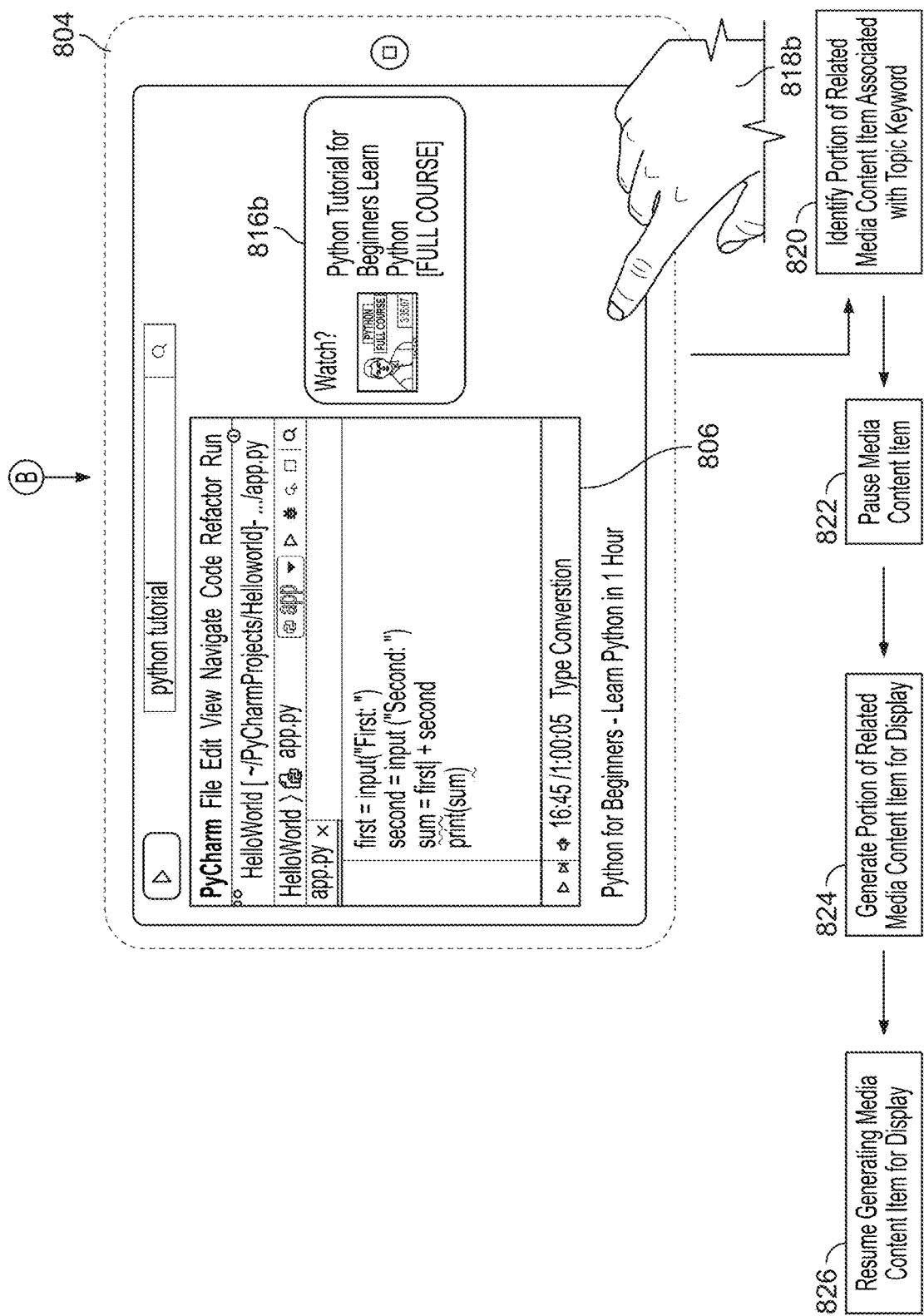
FIG. 8B(Cont...1)

DYNAMICALLY GENERATING AND HIGHLIGHTING REFERENCES TO CONTENT SEGMENTS IN VIDEOS RELATED TO A MAIN VIDEO THAT IS BEING WATCHED

BACKGROUND

The present disclosure is directed towards systems and methods for dynamically referring to related media content items and identifying related media content items in response to receiving a user interface inputs. In particular, systems and methods are provided herein that identify a topic and/or keyword associated with a media content item and identify portions of media content items related to the identified topic and/or keyword.

SUMMARY

Media streaming platforms, such as YouTube and Vimeo, and online educational streaming platforms, such as edX, enable users to view media content items and to learn new skills, such as programming, cooking or auto maintenance. Typically, these media content items comprise long-form media content items, for example, in the case of a university lecture, media content lasting at least an hour. During such long-form media content items, many topics may be covered. In the example of a university lecture, some topics may be discussed in detail, while other topics may simply be referenced. For example, the main topic of a media content item comprising a lecture on JavaScript programming might be an introduction to JavaScript objects. In the media content item, a lecturer may begin the lecture by talking about how JavaScript objects have properties that can be initialized, added or removed. In this example, the lecturer may then refer to a more advanced, but related, topic such as JavaScript keyed collections. At this point in the media content item, the viewer may wish to consume a media content item comprising a detailed explanation of what JavaScript keyed collections are. The user interface of a typical media player may provide a user with an option to consume media content items that are related to the entire media content item being viewed. In the above example, the media player may provide a user interface comprising an option to consume media content items related to JavaScript. In order to identify a media content item, a user will then have to manually browse through the related videos and identify any parts of a media content item that are related to the topic that they are interested in, such as JavaScript keyed collections in the above example. The user interface of the media player may not provide enough information for a user to make an informed decision on which videos are the most relevant. As such, a user may browse through many related media content items in an attempt to find a more detailed explanation of a topic that they are interested in. This browsing is likely to include the user selecting multiple media content items, and skipping forwards and backwards through each of the selected media content items in an attempt to find a part that gives a more detailed explanation about a topic that they are interested in. Manually browsing through each of the related videos to find a more detailed explanation of a topic that a user is interested in will generate additional user interface requests to receive media content items, and additional requests to rewind and/or fast-forward through the selected media content items (many of which will not be of use to the user) because they are manually browsing to find portions of interest. As the user will ultimately discard/skip over a lot of the content that is not relevant in order to find relevant content, network bandwidth and/or processing resources will be wasted during the delivery of content that is not relevant.

To overcome these problems, systems and methods are provided herein that are capable of dynamically referring to related media content items and identifying related media content items in response to receiving user interface inputs. More specifically, systems and methods are provided herein that identify a topic and/or keyword associated with a media content item and identify portions of media content items related to the identified topic and/or keyword.

Systems and methods are described herein for generating an improved user interface that dynamically refers to related portions of media content items. In accordance with some aspects of the disclosure, a method is provided. The method includes transmitting a first media content item for output at a computing device, wherein the first media content item comprises a plurality of portions, and causing the computing device to generate the first media content item for display. A first keyword associated with a currently transmitted first portion of the first media content item is identified, and a first related media content item, where the first related media content item comprises a first portion associated with the identified first keyword, is identified. The computing device is caused to generate for display a first identifier of the identified first related media content item, where the first identifier comprises an identification of the first portion of the identified first related media content item that is associated with the identified first keyword. In response to detecting user interaction with the first identifier, the computing device is caused to pause the generating for display the first media content item. The first portion of the identified first related media content item that is associated with the identified first keyword is transmitted for display, and the computing device is caused to resume generating for display the media content item.

This addresses the issues associated with a system receiving user interface inputs to select multiple media content items, and a user having to skipping forwards and backwards through each of the selected individual media content items in an attempt to find a part that gives a more detailed explanation about a topic that they are interested in. The number of additional user interface requests to receive media content items, and additional requests to rewind and/or fast-forward through the selected media content items, is greatly reduced, as a relevant portion of a related media content item is identified and generated for output. This will greatly reduce (or entirely eliminate) the amount of searching that has to be performed to find further information on a topic, which will greatly reduce (or entirely eliminate) the content that is transmitted that is ultimately discarded due to it not being of relevance. This in turn will reduce the amount of network bandwidth and/or processing resources required when the system described is implemented.

In an example system, a video streaming provider is accessed, such as YouTube, via a media player running on a computing device, such as a tablet. A user interface input is received, for example, for selecting a video comprising a coding tutorial via a user interface of the media player, and the user watches the video on the tablet. The video comprises different portions, or chapters, each relating to different parts of the coding tutorial. A keyword or keywords associated with a first portion of the video are identified. For example, the identified keywords may be "JavaScript objects" for a portion of a coding tutorial. In a part of the media player user interface, media content items related to the identified keywords are generated for display, and portions of those related media content items are identified based on the identified keyword. For example, general JavaScript tutorial videos may be displayed in the user interface, and the portions of those videos that are relevant to JavaScript objects may be identified. When a user interface input is received for selecting one of the related videos, the initial video pauses, the media player jumps directly to the relevant portion of the selected video, and it is displayed at the tablet. Once the relevant portion has finished playing, playback of the initial video resumes.

A second keyword associated with a currently transmitted second portion of the first media content item may be identified, and a second portion of the first related media content item associated with the identified second keyword may also be identified. The computing device may be caused to generate for display an updated first identifier of the identified first related media content item, where the updated first identifier comprises an indication of a second portion of the identified first related media content item that is associated with the identified second keyword. In response to receiving a user interface interaction with the updated first identifier, the computing device may be caused to pause the generating for display the first media content item. The second portion of the identified first related media content item that is associated with the identified second keyword may be transmitted for display, and the computing device may be caused to resume generating for display the media content item.

Continuing the above example, as the video is consumed, it progresses through different portions of the video, or chapters, each relating to different parts of the coding tutorial. As the playing of the video progresses through a second portion of the video, a keyword or keywords associated with the second portion are identified. As the subsequent keywords are identified, the related video section of the media player user interface is updated to indicate second portions of the related media content items associated with the second keyword. When a user interface input is received for selecting one of the related videos, the initial video pauses, the media player jumps directly to the second portion of the selected related video, and it is displayed at the tablet. Once the second portion has finished playing, playback of the initial video resumes.

A second keyword associated with a currently transmitted second portion of the first media content item may be identified, and a second related media content item may be identified, where the second related media content item comprises a portion associated with the identified second keyword. The computing device may be caused to stop generating for display the first identifier of the identified first related media content item. The computing device may be caused to generate for display a second identifier of the second related media content item, where the identifier comprises an identification of the portion of the identified second related media content item that is associated with the identified second keyword. In response to detecting a user interface interaction with the second identifier, the computing device may be caused to pause the generating for display the first media content item. The portion of the identified second related media content item that is associated with the identified second keyword may be transmitted for display, and the computing device may be caused to resume generating for display the first media content item.

Continuing the above example, rather than indicating a second portion of an already-identified related video when a second keyword or keywords are identified, the related video section of the media player user interface is updated to indicate a portion of different related media content items associated with the second keyword, or a portion of the already displayed media content item. When user interface input is received for selecting one of the related videos, the initial video pauses, and the media player jumps directly to the portion of the selected related video and it is displayed at the tablet. Once the portion has finished playing, the playback of the initial video resumes.

Identifying the first related media content item may further comprise identifying a first plurality of related media content items, where each of the first plurality of related media content items comprises a portion associated with the identified first keyword. A first plurality of identifiers may be generated for display, where each of the first plurality of identifiers comprises an identification of a portion of the identified first plurality of related media content items that is associated with the identified first keyword. A first subset of related media content items of the identified first plurality of related media content items may be identified, where a portion of a related media content item of the identified first plurality of related media content items is associated with the second identified keyword. The computing device may be caused to stop generating for display the identifiers that are not associated with the first subset of related media content items.

Continuing the above example, the related video section of the media player user interface is updated to remove related videos that are no longer relevant to the section of the initial video that is being displayed at the tablet.

In accordance with a second aspect of the disclosure, a method is provided. The method includes transmitting a first media content item for output at a computing device and causing the computing device to generate the first media content item for display. A user interface input requesting media content related to the first media content item is received. In response to the receipt of the user interface input requesting related content, a number of actions are performed. Metadata for a portion of the first media content item is accessed within a predetermined time period away from a play position of the first media content item at which the user interface input requesting related media content was received. A topic keyword based on the accessed metadata is identified. An offer to interrupt output of the first media content item to output content related to the topic keyword is generated for display. In response to receiving acceptance of the offer, a number of actions are also performed. A portion of an identified related media content item that is associated with the identified topic keyword is identified. The first media content item being generated for display is paused. The portion of the identified related media content item that is associated with the identified first keyword is transmitted for display, and the computing device is caused to resume generating for display the media content item.

Again, this addresses the issues associated with a system receiving user interface inputs to select multiple media content items, and a user having to skipping forwards and backwards through each of the selected individual media content items in an attempt to find a part that gives a more detailed explanation about a topic that they are interested in. The number of additional user interface requests to receive media content items, and additional requests to rewind and/or fast-forward through the selected media content items, is greatly reduced, as a relevant portion of a related media content item is identified, selected, and generated for output. This will greatly reduce (or entirely eliminate) the amount of searching that has to be performed to find further information on a topic, which will greatly reduce (or entirely eliminate) the content that is transmitted that is ultimately discarded due to it not being of relevance. This in turn will reduce the amount of network bandwidth and/or processing resources required when the system described is implemented.

In an example system, a user interface input is received to access a video streaming provider, such as YouTube, via a media player running on a computing device, such as a tablet. A user interface input to select, for example, a video comprising a coding tutorial via a user interface of the media player is received, and a video is generated for display on the tablet. The video comprises different portions, or chapters, each relating to different parts of the coding tutorial. While watching one of the portions, a user interface input is received at a user interface element, for example, a button, to indicate that video that is related to the currently displayed portion of the, in this example, coding tutorial video should be generated for display. In response to receiving the user interface input, metadata associated with the currently displayed portion of the video is accessed, based on a time period around the current position within the video, for example the five seconds preceding the play position. In this example, if the video was at a time position of 10:07, the metadata would be associated with the period between 10:02 and 10:07. A topic keyword is identified based on the metadata and, based on the topic keyword, a user interface element, such as a button, is generated that enables a video related to the portion of the initial video (in this example, the coding tutorial) to be generated for output. On reception of a user interface input indicating a selection of the user interface element, a portion of an identified related media content item that is associated with the identified topic keyword is identified, the initial video pauses, the media player jumps directly to the relevant portion of the selected video, and it is displayed at the tablet. Once the relevant portion has finished playing, playback of the initial video resumes.

In response to receiving a second interface input for the aforementioned user interface element to indicate that video that is related to the currently displayed portion of the media content item should be generated for display, for example, during a second portion of the media content item, a second portion of the related media content item may be identified and an offer related to the second portion may be generated for display. In a similar manner to before, if a user interface input is received with respect to the offer, the media content item is paused, and the second portion of the related media content item is generated for display. In another example, if it is a first portion of a second related media content item that is identified, an offer based on the second related media content item is generated for display. Again, if a user interface input is received with respect to the offer, the media content item is paused, and the first portion of the second related media content item is generated for display.

In other examples, receiving a first user interface input with respect to the offer may cause an output to be generated that cycles through different available related media content items. Receiving a second user interface input with respect to the offer may cause a related media content item to be selected, pause the media content item and generate a portion of the related media content item to be generated for output. Different user interface inputs may comprise different gestures and/or lengths of interaction, such as touch events.

The predetermined time period may occur before the play position of the first media content item, or may start before the play position of the first media content item and finish after the play position of the first media content item.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
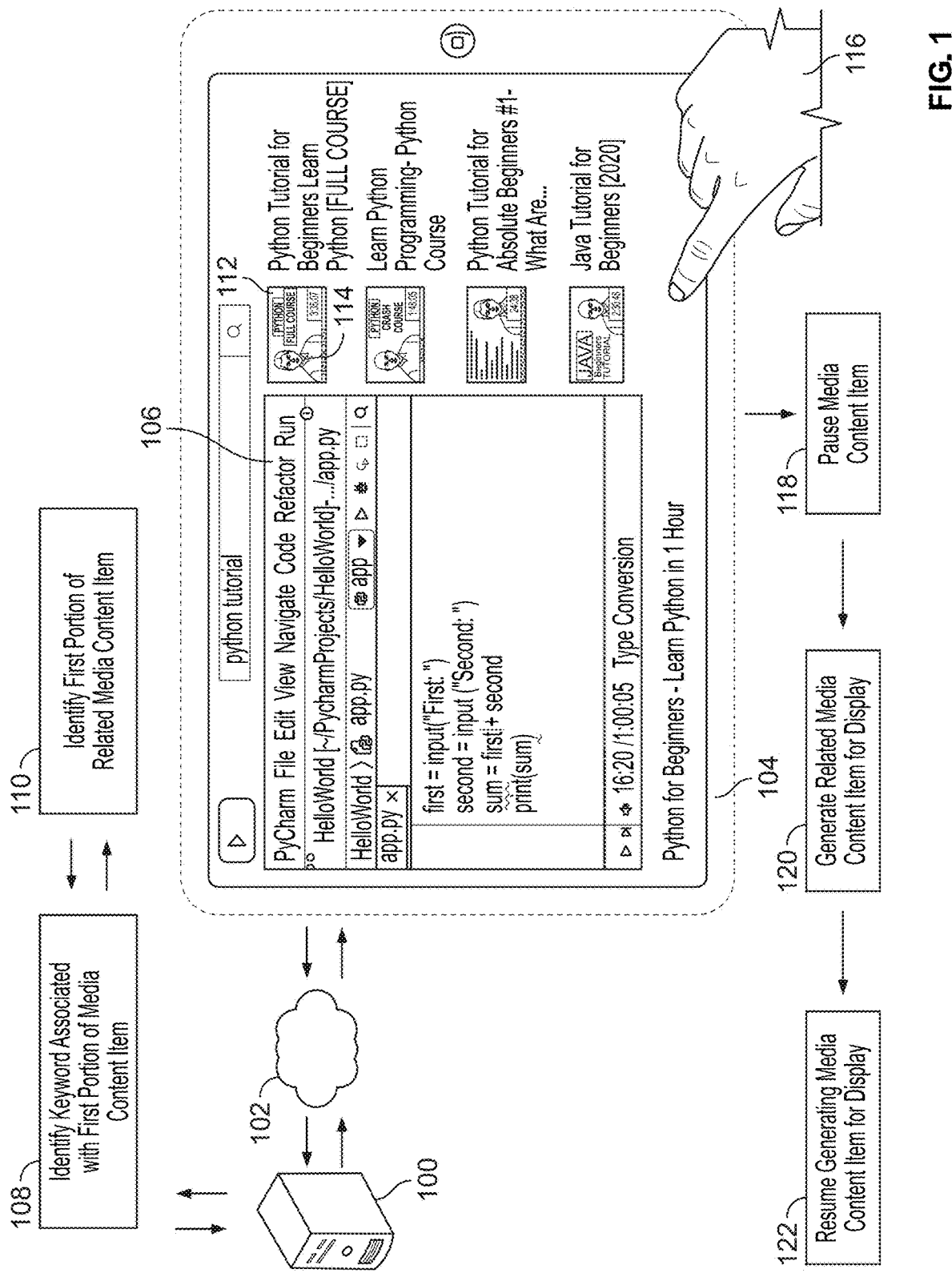
FIG. 1 shows an example environment in which related media content items are dynamically referred to, in accordance with some embodiments of the disclosure.

Systems and methods are described herein for dynamically referring to related media content items and identifying related media content items in response to receiving user interface inputs. A media content item may comprise a number of portions, or chapters. These portions may be identified in metadata associated with the media content item and may include titles and/or descriptions related to the content of the portion. The media content item may be of any suitable known format. One example of a suitable media content item is one that complies with the MPEG DASH standard. Media content items include audio, video and/or any other media content. Audio includes audio-only content, such as podcasts, stories and music. Video includes audio-visual content such as movies and/or television programs. An over-the-top (OTT) content and/or video sharing platform may be accessed via a website and/or an app running on a computing device and may receive any type of media content, including live media content and/or on-demand media content.

A keyword is any word, or words, that indicate the content of a portion of a media content item. A keyword may be identified via metadata, object identification processing, processing of subtitles, and/or audio associated with a media content item. A portion of a media content item may be associated with a keyword if the keyword indicates the content of the portion. Related media content items are those that comprise at least a portion that covers content that is, at least, broadly similar to a portion of a media content item (i.e., an original, first, or initial media content item). Some portions of the related media content item may not be related to the original media content item at all.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment in which related media content items are dynamically referred to, in accordance with some embodiments of the disclosure. The environment comprises a first computing device, such as server 100, on which a media content item is stored; a network 102, for transmitting the media content item; and a computing device, such as tablet 104, for receiving the media content item. The network 102 may be the internet and may comprise wired and/or wireless means for transmitting the media content from the server 100 to the tablet 104. In some examples, the server 100 is an edge server. In some examples, the tablet 104 runs a media player on a website of a video streaming provider in order to generate the media content item for output and to display 106 the media content item. If the computing device is, for example, a smart speaker, and the media content is audio-only media content, then generating the media content for output may comprise generating a signal that causes a speaker to output the audio content. If the computing device is a smart speaker, then the inputs and outputs described herein may take the form of receiving an audible input via a microphone coupled to the computing device and generating audible outputs via a speaker coupled to the computing device. At the server 100, a keyword associated with a first portion of the media content item is identified 108. A related media content item and a first portion of the related media content item are also identified 110, based on the identified keyword. The first portion of the related media content item is not necessarily the first portion at the beginning of the related media content item; rather, it is the portion that has been identified to be associated with the keyword. In some examples, either, or both, of these steps may be carried out at another server or at the computing device itself. This other server may be a different physical server, virtual machine running on the same physical server and/or a combination of the two. In an example system, a first portion of a media content item may be related to type conversion in the Python coding language. Keywords, such as "type," "conversion" and "Python," may be identified based on the content of the first portion. A related media content item comprising a portion related to type conversion in Python may be identified, along with the specific portion of the related media content item that relates to type conversion in Python.

Data is transmitted, from the server 100 to the tablet 104, that enables the tablet to generate an identifier 112 of the related media content item, including an indication 114 of the first portion of the related media content item associated with the identified keyword. In this example, a thumbnail of the related media content item is generated for display, and the portion of the progress bar that corresponds to the identified first portion is colored in a color that is different from the rest of the progress bar, so that it stands out. Any other known way of identifying the portion may be implemented, for example using highlighting, shading, or a label and/or placing a marker to indicate the relevant portion. A user interface input is received at the tablet via a touch event 116 to select the related media content item. In other examples, the user interface inputs may be received at the tablet 104 in any known way, for example via a voice command, or a peripheral device connected to the tablet 104. On receiving the touch event 116, the media player running on the tablet 104 pauses 118 the media content item. The first portion of the related media content item is requested from the server 100, transmitted to the tablet 104 via the network 102, and generated for display 120. Once the first portion of the related media content item has been displayed at the tablet 104, the display of the initial media content item resumes 122. An advantage of this arrangement is that a relevant portion of a related media content item is easily accessible via the user interface of the media player. This addresses the issues associated a system receiving user interface inputs to select multiple media content items, and a user having to skip forwards and backwards through each of the selected individual media content items in an attempt to find a part that gives a more detailed explanation about a topic that they are interested in. The number of additional user interface requests to receive media content items, and additional requests to rewind and/or fast-forward through the selected media content items, is greatly reduced, as a relevant portion of a related media content item is identified and generated for output. This will greatly reduce (or entirely eliminate) the amount of searching that has to be performed to find further information on a topic, which will greatly reduce (or entirely eliminate) the content that is transmitted that is ultimately discarded due to it not being of relevance. This in turn will reduce the amount of network bandwidth and/or processing resources required when the system described is implemented.

In some examples, related media content items and/or portions of related media content items may be identified based on a factor, such as a related factor. The related factor may be based on, for example, similar metadata, popular segments, or historical mass consumption where a large percentage of viewers that watched a certain portion in a first media content item also watched a certain portion in a second media content item). The related factor value may be dynamic and may change based on mass consumption (for example, based on data collected from a plurality of media players). For example, as more computing devices stream a specific portion in a related media content item and then revert to resuming the original media content item, the related factor may increase, since this can be considered an indication of direct correlation. Similarly, the factor may decrease if computing devices start streaming a portion of a related media content item, but quickly revert to the original media content item.

Figure 2A:
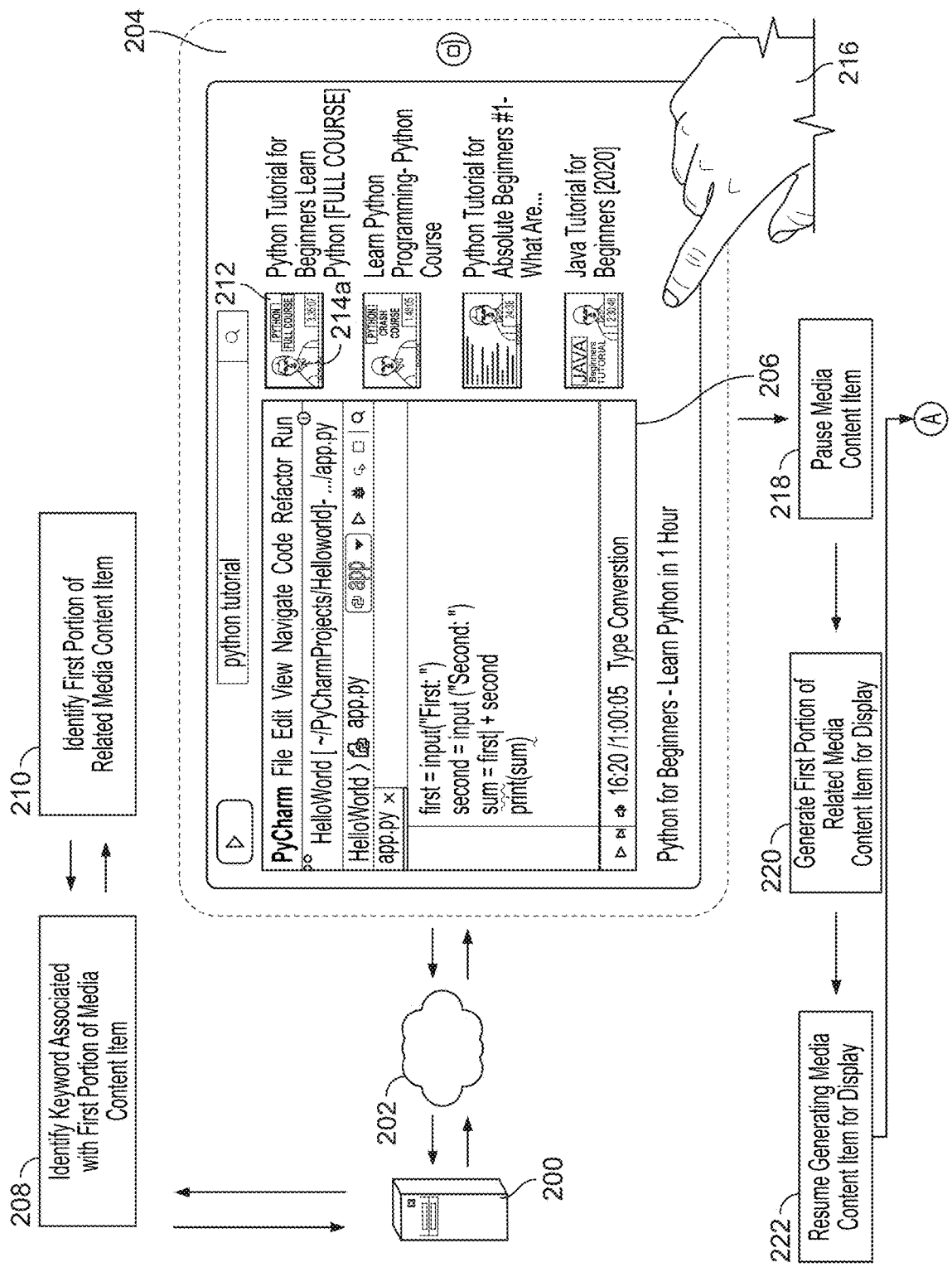
FIG. 2A shows another example environment in which related media content items are dynamically referred to, in accordance with some embodiments of the disclosure.

FIG. 2A shows another example environment in which related media content items are dynamically referred to, in accordance with some embodiments of the disclosure. In a similar manner to the environment shown in FIG. 1, the environment comprises a server 200, which transmits media content items, via a network 202, to a tablet 204. As before, the tablet 204 runs a media player on a website of a video streaming provider in order to generate the media content item for output and to display 206 the media content item. At the server 200, a keyword associated with a first portion of the media content item is identified 208. A related media content item and a first portion of the related media content item are also identified 210, based on the identified keyword. Data is transmitted, from the server 200 to the tablet 204, that enables the tablet to generate an identifier 212 of the related media content item, including an indication 214a of the first portion of the related media content item associated with the identified keyword. A user interface input is received at the tablet via a touch event 216 to select the related media content item. On receiving the touch event 216, the media player running on the tablet 204 pauses 218 the media content item. The first portion of the related media content item is requested from the server 200, is transmitted to the tablet 204 via the network 202, and is generated for display 220. Once the first portion of the related media content item has been displayed at the tablet 204, the display of the initial media content item resumes 222.

As the initial media content item progresses on to a second portion, at the server 200, a keyword associated with the second portion of the media content item is identified 224. A second portion of the related media content item is also identified 226, based on the identified keyword. Data is transmitted, from the server 200 to the tablet 204, that enables the tablet to generate an identifier 228 of the related media content item, including the indication 214a of the first portion of the related media content item and an indication 214b of the second portion of the related media content item associated with the identified keyword. A user interface input is received at the tablet via a touch event 230 to select the related media content item. On receiving the touch event 230, the media player running on the tablet 204 pauses 232 the media content item. The second portion of the related media content item is requested from the server 200, transmitted to the tablet 204 via the network 202, and generated for display 234. Once the first portion of the related media content item has been displayed at the tablet 204, the display of the initial media content item resumes 236.

Figure 2B:
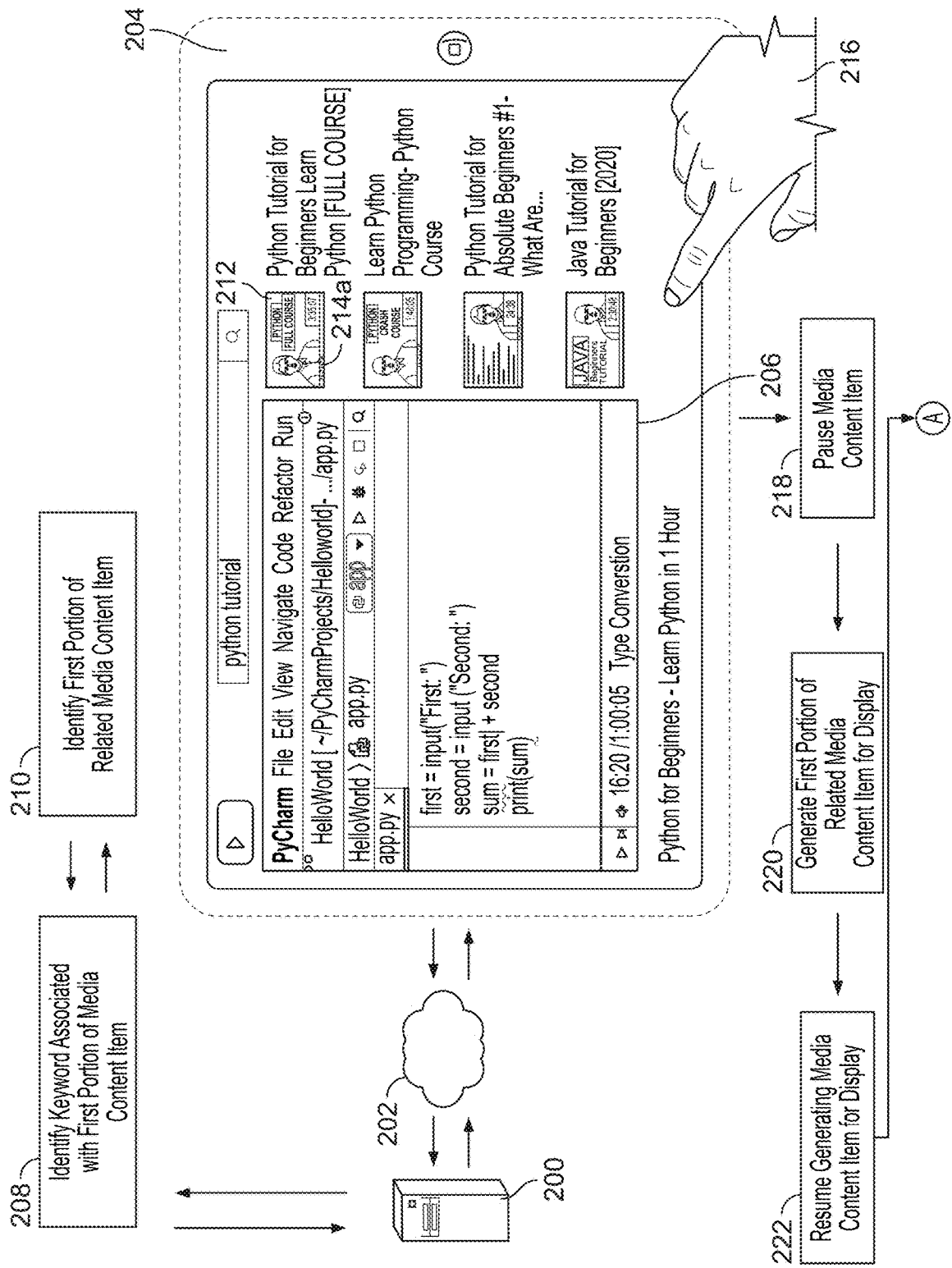
FIG. 2B shows another example environment in which related media content items are dynamically referred to, in accordance with some embodiments of the disclosure.

FIG. 2B shows another example environment in which related media content items are dynamically referred to, in accordance with some embodiments of the disclosure. The environment shown in FIG. 2B is the same as that shown in FIG. 2A. Again, as the initial media content item progresses on to a second portion, at the server 200, a keyword associated with the second portion of the media content item is identified 224. A second portion of the related media content item is also identified 226, based on the identified keyword. Data is transmitted, from the server 200 to the tablet 204, that enables the tablet to generate an identifier 228 of the related media content item. However, where the environment of FIG. 2B differs is that only an indication 214b of the second portion of the related media content item associated with the identified keyword is generated for display. Again, a user interface input is received at the tablet via a touch event 230 to select the related media content item. On receiving the touch event 230, the media player running on the tablet 204 pauses 232 the media content item. The second portion of the related media content item is requested from the server 200, transmitted to the tablet 204 via the network 202, and generated for display 234. Once the first portion of the related media content item has been displayed at the tablet 204, the display of the initial media content item resumes 236.

Figure 3:
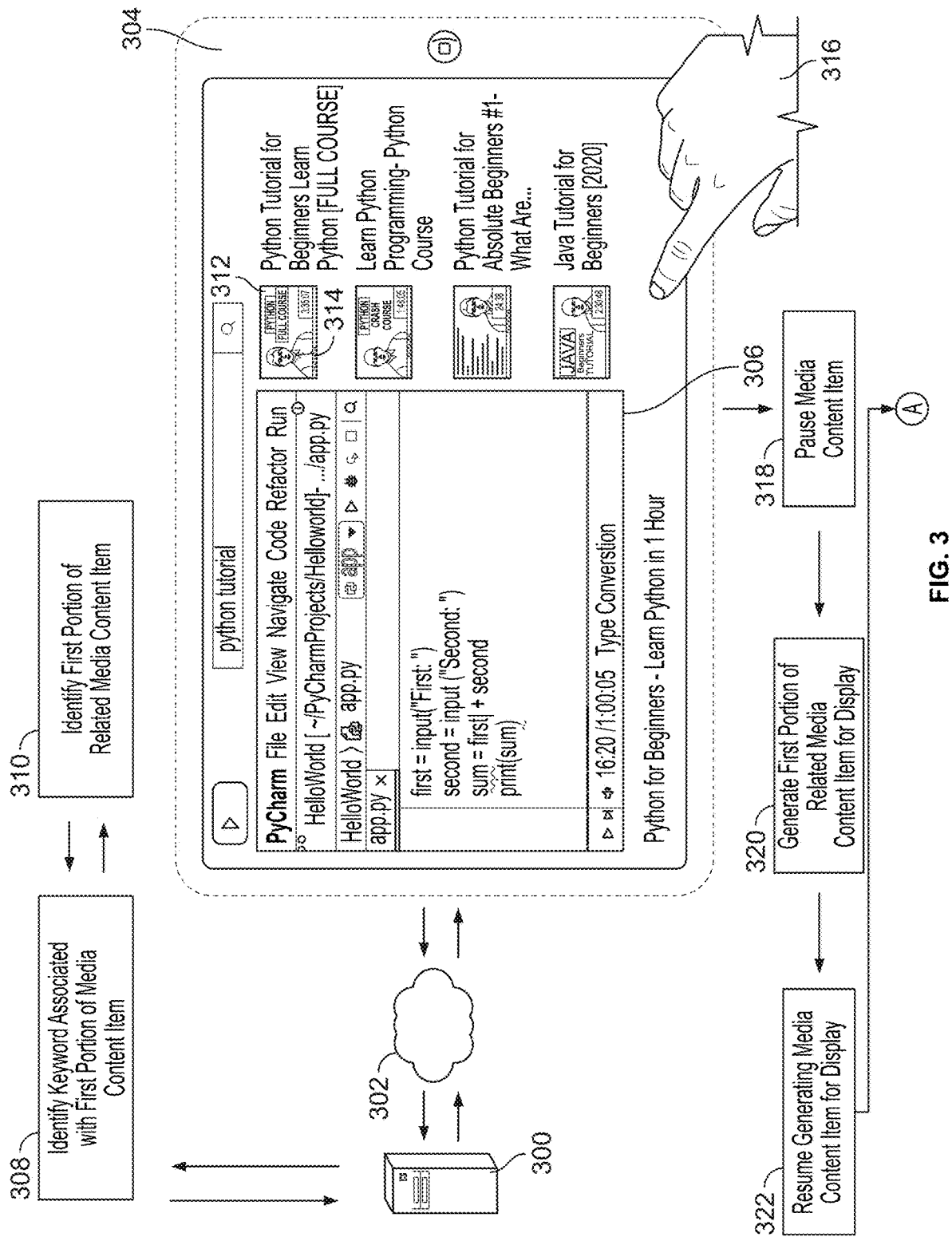
FIG. 3 shows another example environment in which related media content items are dynamically referred to, in accordance with some embodiments of the disclosure.

FIG. 3 shows another example environment in which related media content items are dynamically referred to, in accordance with some embodiments of the disclosure. In a similar manner to the environments discussed above, the environment comprises a server 300, which transmits media content items, via a network 302, to a tablet 304. As before, the tablet 304 runs a media player on a website of a video streaming provider in order to generate the media content item for output and to display 306 the media content item. At the server 300, a keyword associated with a first portion of the media content item is identified 308. A related media content item and a first portion of the related media content item are also identified 310, based on the identified keyword. Data is transmitted, from the server 300 to the tablet 304, that enables the tablet to generate an identifier 312 of the related media content item, including an indication 314 of the first portion of the related media content item associated with the identified keyword. A user interface input is received at the tablet via a touch event 316 to select the related media content item. On receiving the touch event 316, the media player running on the tablet 304 pauses 318 the media content item. The first portion of the related media content item is requested from the server 300, transmitted to the tablet 304 via the network 302, and generated for display 320. Once the first portion of the related media content item has been displayed at the tablet 304, the display of the initial media content item resumes 322.

As the initial media content item progresses on to a second portion, at the server 300, a keyword associated with the second portion of the media content item is identified 324. A portion of a second related media content item is also identified 326, based on the identified keyword. Data is transmitted, from the server 300 to the tablet 304, that enables the tablet to generate an identifier 328 of the second related media content item, including an indication 338 of the portion of the second related media content item associated with the identified keyword. A user interface input is received at the tablet via a touch event 330 to select the related media content item. On receiving the touch event 330, the media player running on the tablet 304 pauses 332 the media content item. The second portion of the related media content item is requested from the server 300, transmitted to the tablet 304 via the network 302, and generated for display 334. Once the first portion of the related media content item has been displayed at the tablet 304, the display of the initial media content item resumes 336.

Figure 4:
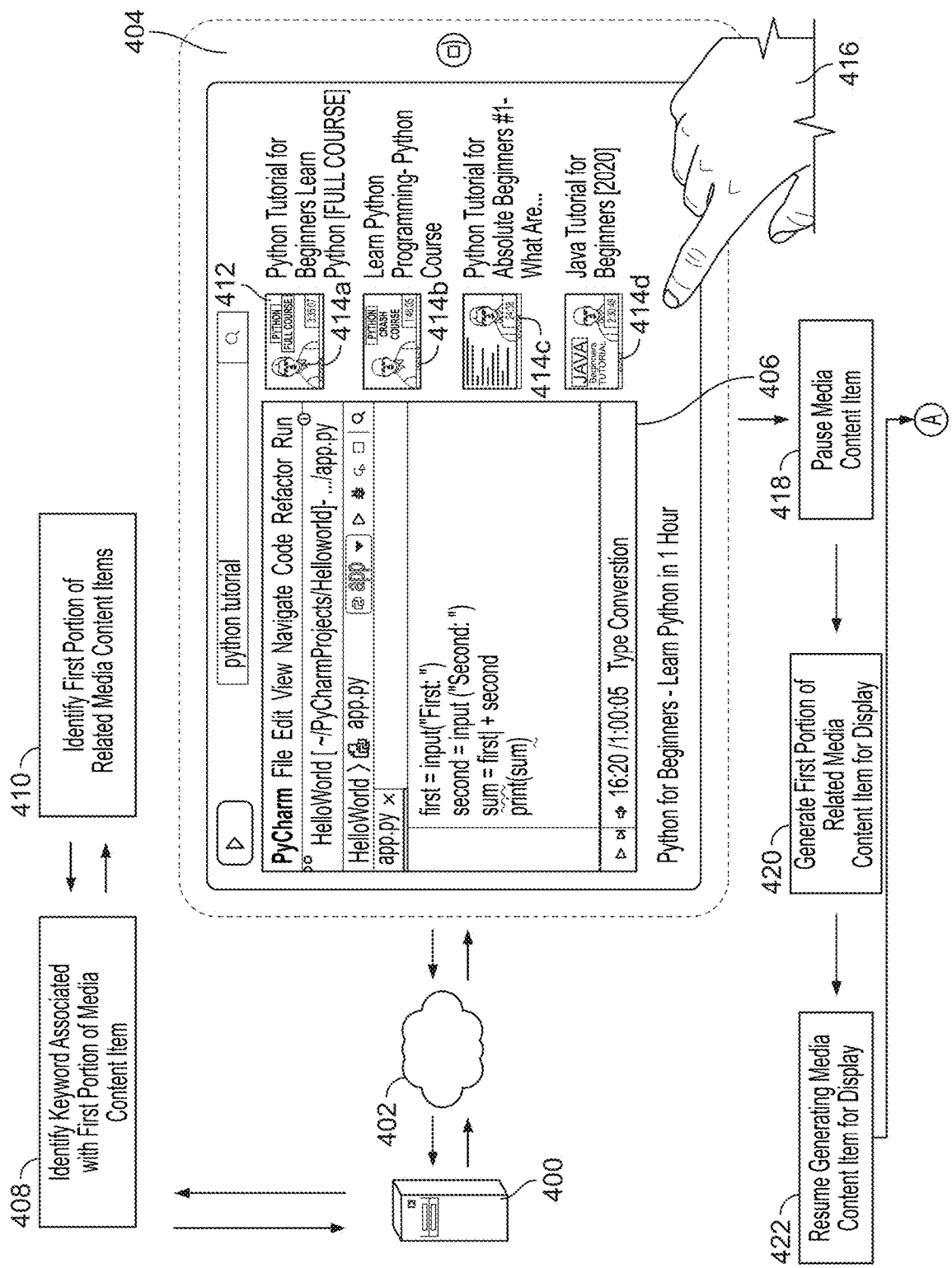
FIG. 4 shows another example environment in which related media content items are dynamically referred to, in accordance with some embodiments of the disclosure.

FIG. 4 shows another example environment in which related media content items are dynamically referred to, in accordance with some embodiments of the disclosure. In a similar manner to the environments discussed above, the environment comprises a server 400, which transmits media content items, via a network 402, to a tablet 404. As before, the tablet 404 runs a media player on a website of a video streaming provider in order to generate the media content item for output and to display 406 the media content item. At the server 400, a keyword associated with a first portion of the media content item is identified 408. A plurality of related media content items and a first portion of the related media content items is also identified 410, based on the identified keyword. Data is transmitted, from the server 400, to the tablet 404, that enables the tablet to generate an identifier 412 of the related media content items, including an indication 414a, 414b, 414c, 414d of the first portion of the plurality of related media content items associated with the identified keyword. A user interface input is received at the tablet via a touch event 416 to select a related media content item. On receiving the touch event 416, the media player running on the tablet 404 pauses 418 the media content item. The first portion of the related media content item is requested from the server 400, transmitted to the tablet 404 via the network 402, and is generated for display 420. Once the first portion of the related media content item has been displayed at the tablet 404, the display of the initial media content item resumes 422.

As the initial media content item progresses on to a second portion, at the server 400, a keyword associated with the second portion of the media content item is identified 424. A second portion of a subset of the plurality of related media content items is also identified 426, based on the identified keyword. Data is transmitted, from the server 400 to the tablet 404, that enables the tablet to generate an identifier 428 of the subset of the plurality of related media content items, including an indication 438a, 438b of the second portion of the related media content items associated with the identified keyword. The user interface is updated to remove the related media content items that comprise a portion related to the first portion of the media content item, but do not comprise a portion related to the second portion of the media content item. A user interface input is received at the tablet via a touch event 430 to select a related media content item. On receiving the touch event 430, the media player running on the tablet 404 pauses 432 the media content item. The second portion of the related media content item is requested from the server 400, transmitted to the tablet 404 via the network 402, and generated for display 434. Once the first portion of the related media content item has been displayed at the tablet 404, the display of the initial media content item resumes 436.

Figure 5:
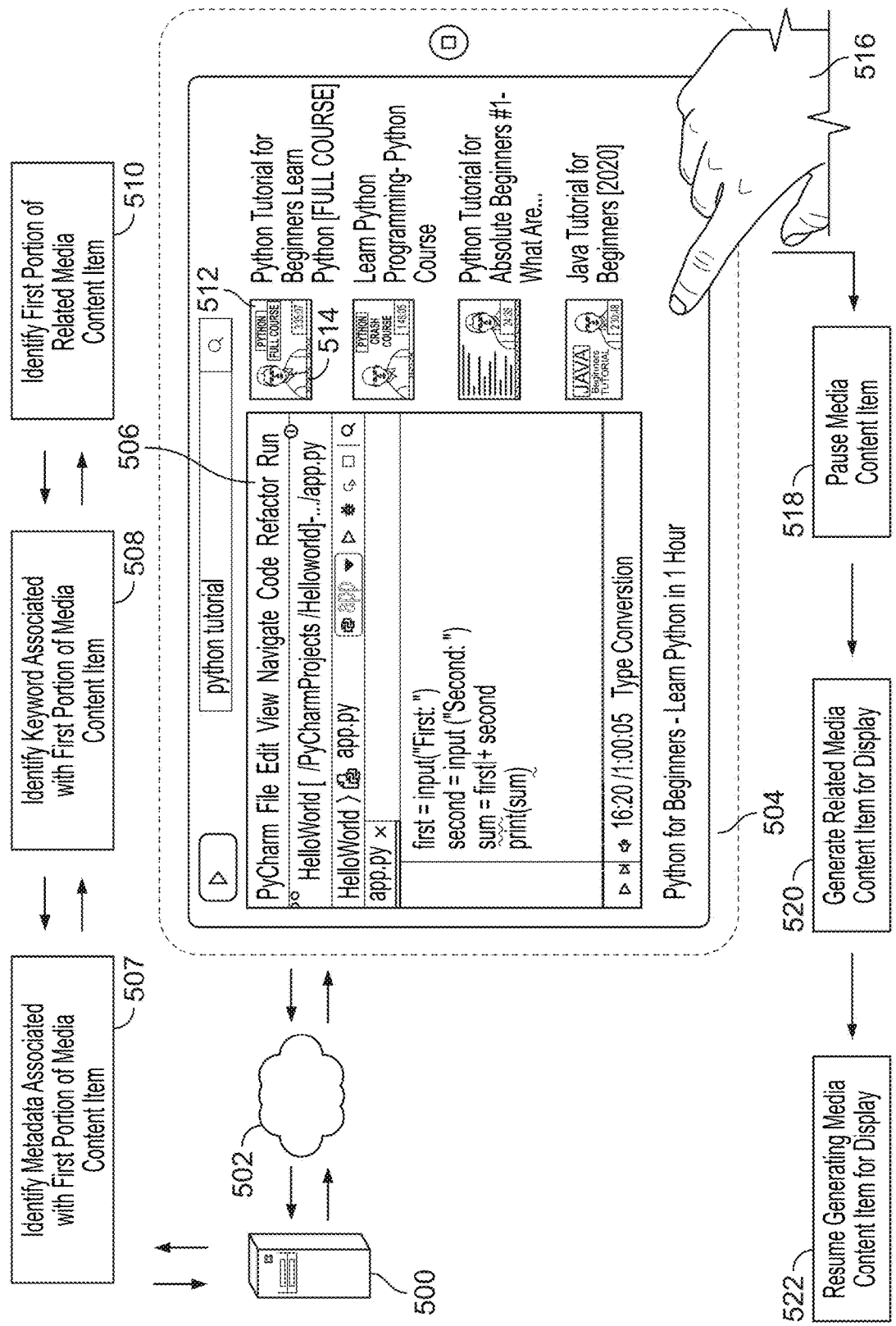
FIG. 5 shows another example environment in which related media content items are dynamically referred to, in accordance with some embodiments of the disclosure.

FIG. 5 shows another example environment in which related media content items are dynamically referred to, in accordance with some embodiments of the disclosure. In a similar manner to the environment discussed above, the environment comprises a server 500, which transmits media content items, via a network 502, to a tablet 504. As before, the tablet 504 runs a media player on a website of a video streaming provider in order to generate the media content item for output and to display 506 the media content item. At the server 500, metadata associated with the first portion of the media content item is identified 507 and, based on the identified metadata, a keyword associated with a first portion of the media content item are also identified 508. The metadata typically describes the content of the first portion of the media content item, which gives rise to the association between the first portion of the media content item and the keyword. A related media content item and a first portion of the related media content item is also identified 510, based on the identified keyword. Data is transmitted, from the server 500 to the tablet 504, that enables the tablet to generate an identifier 512 of the related media content item, including an indication 514 of the first portion of the related media content item associated with the identified keyword. A user interface input is received at the tablet via a touch event 516 to select the related media content item. On receiving the touch event 516, the media player running on the tablet 504 pauses 518 the media content item. The first portion of the related media content item is requested from the server 500, transmitted to the tablet 504 via the network 502, and generated for display 520. Once the first portion of the related media content item has been displayed at the tablet 504, the display of the initial media content item resumes 522.

In some examples, the server 500 is a server of an analytics service with its own backend logic that analyzes metadata related to content being played in order to find related media content items and corresponding segments. For example, a media content item may be chaptered (with each chapter corresponding to a portion of the media content item), with a chapter having a title, start time and end time. The titles of the chapters within the media content item may describe a topic. In the case that the title of a chapter alone does not enable the analytics engine to identify a relevant portion of a related media content item to recommend to the user, the analytics service may obtain additional data from, for example, an internet-connected database comprising information regarding media content items. In one example, the additional data could be sourced from the audio of a media content item, including, for example, via a closed caption (or subtitle) file describing an audio track of the media content item. Additionally, or alternatively, audio of a media content item may be automatically transcribed. The analytics service may analyze chapters within a media content item to determine a main topic (or keyword) as well as secondary topics (or keywords). A portion of a related media content item whose main topic is highly relevant to the secondary topic in the original media content item may also (or alternatively) be identified. Such portion of a related media content item may also be identified based on chapter metadata and/or audio transcription or any other metadata (e.g., comments, tags, etc.) associated with the related media content item.

In one example, the portion of the related media content items are based on tags associated with the original media content item. For example, a media content item with the tag "John Wick: Chapter 4" may have a start time and an end time associated with it indicating a start time and an end time of a scene within the media content item. In another example, the tags may correlate to chapters (or portions) or segments of chapters associated with a media content item. In some examples, tags may be automatically generated when media content items are uploaded to, for example, a media streaming platform. In an example, a tag under a media content item in a related section may be highlighted, and a user interface input to select such tag would automatically play the portion of the media content item associated with the tag, while the original media content item is paused, as described herein. Different tags associated with different media content items in a "Related" section may be highlighted and updated throughout a streaming session as the original media content item progresses.

In order to stream different media content items to different computing devices, and to dynamically highlight different portions of related media content items in real time, a streaming session may be identified and shared with a dedicated recommender or clipping service. The recommender, or clipping, service utilizes a unique identifier associated with an original media content item being streamed in order to track how much has been streamed to a computing device. A clipping service may be used to clip a portion of related media content in order to produce a short-form media content item. The clipping service may only perform such processing on portions of related media content items that are likely to be requested by a computing device based on, for example, data stored with a user profile, such as user preferences, a watch history and/or a bias towards a specific content type. A "Related" video section displayed, for example, in the user interface of a media player, may include a mix of short-form and long-form media content items. In some examples, only long-form related media content items may require metadata to highlight the portions, but not the short-form media content items. Both short-form and long-form media content items may make up a playlist that is generated based on a playback service sending the data regarding the original media content item to a recommender service.

In some examples, the number of media content items in a, for example, related list is based on the historical utilization of the related list. This might include, for example, how often portions of the related media content items are requested during the consumption of a main media content item. In another example, the number of media content items may be based on a determined user preference; for example, portions of a related media content item are only requested when the main media content item is related to celebrity gossip. In other examples, the number of media content items may be based on a popularity of the main media content item. Such a feature may be enabled or disabled via a user interface input.

In some examples, the related list may be communicated to a media player in the form of a playlist. A playback application programming interface (API) can share a reference, or an identification of the media content item currently being played, with a recommender service, so that the recommender service can generate data for the playlist of related items. The related videos playlist and can be communicated to a media player in JavaScript object notation (JSON) format. The recommender service can transmit updates, or partial updates, to refresh the highlighted portions of related media content items or to replace media content items in the playlist. Similarly, the URL to a media content item can be deep linked to a portion of a related media content item.

Figure 6:
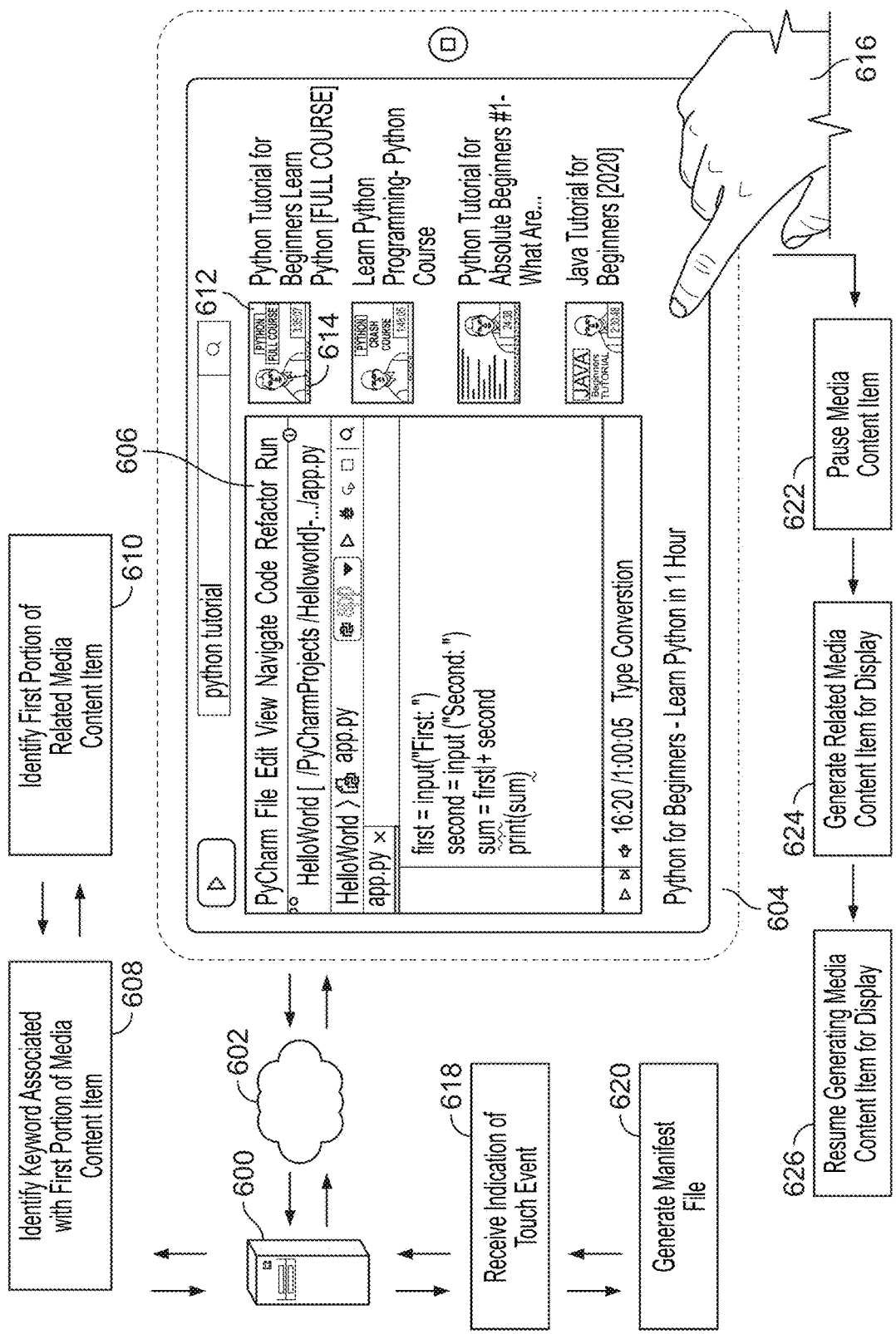
FIG. 6 shows another example environment in which related media content items are dynamically referred to, in accordance with some embodiments of the disclosure.

FIG. 6 shows another example environment in which related media content items are dynamically referred to, in accordance with some embodiments of the disclosure. In a similar manner to the environment discussed above, the environment comprises a server 600, which transmits media content items, via a network 602, to a tablet 604. As before, the tablet 604 runs a media player on a website of a video streaming provider in order to generate the media content item for output and to display 606 the media content item. At the server 600, a keyword associated with a first portion of the media content item is identified 608. A related media content item and a first portion of the related media content item are also identified 610, based on the identified keyword. Data is transmitted, from the server 600 to the tablet 604, that enables the tablet to generate an identifier 612 of the related media content item, including an indication 614 of the first portion of the related media content item associated with the identified keyword. A user interface input is received at the tablet via a touch event 616 to select the related media content item. On receiving the touch event 616 at the tablet 604, an indication of the touch event is transmitted from the tablet 604, via the network 602, to the server 618. On receiving 618 the touch event, a manifest file 620 is generated at the server 618. See Table 1 for an exemplary pseudo-manifest file data structure. As can be seen in Table 1, the manifest file indicates a segment, a segment quality and an associated segment address. Segment 1-1 corresponds to the first portion of the media content item. Segment 2-3 corresponds to a third portion of the related media content item, and segment 1-2 corresponds to the second portion of the media content item. The media player plays the segments in the order indicated, but may choose between different segment qualities, depending on, for example, network conditions.

TABLE 1

| Segment no. | Quality | Segment Address |
| --- | --- | --- |
| 1-1 | 360p | http://example.com/1/1-1 |
| 1-1 | 720p | http://example.com/1/1-1 |
| 2-3 | 360p | http://example.com/1/2-1 |
| 2-3 | 720p | http://example.com/1/2-2 |
| 1-2 | 360p | http://example.com/1/3-1 |
| 1-2 | 720p | http://example.com/1/3-2 |

The manifest file 620 is transmitted from the server 600, via the network 602, to the tablet 604, where it is used to request and receive the first portion of the related media content item. The media player running on the tablet 604 pauses 622 the media content item. The first portion of the related media content item is requested from the server 600, transmitted to the tablet 604 via the network 602, and generated for display 624. Once the first portion of the related media content item has been displayed at the tablet 604, the display of the initial media content item resumes 626.

The manifest file may include references to different portions associated with the related media content items. If the portion-to-portion associations between various related media content items are known ahead of time, then the manifest file can be generated before a media content item is streamed to a computing device. However, in some examples, the portion-to-portion associations in the manifest file may be updated as more related media content items are identified, and as the related factor (as discussed above) changes. The updated manifest file can be transmitted along with a media content items if the request for the media content item has known related media content items.

Figure 7:
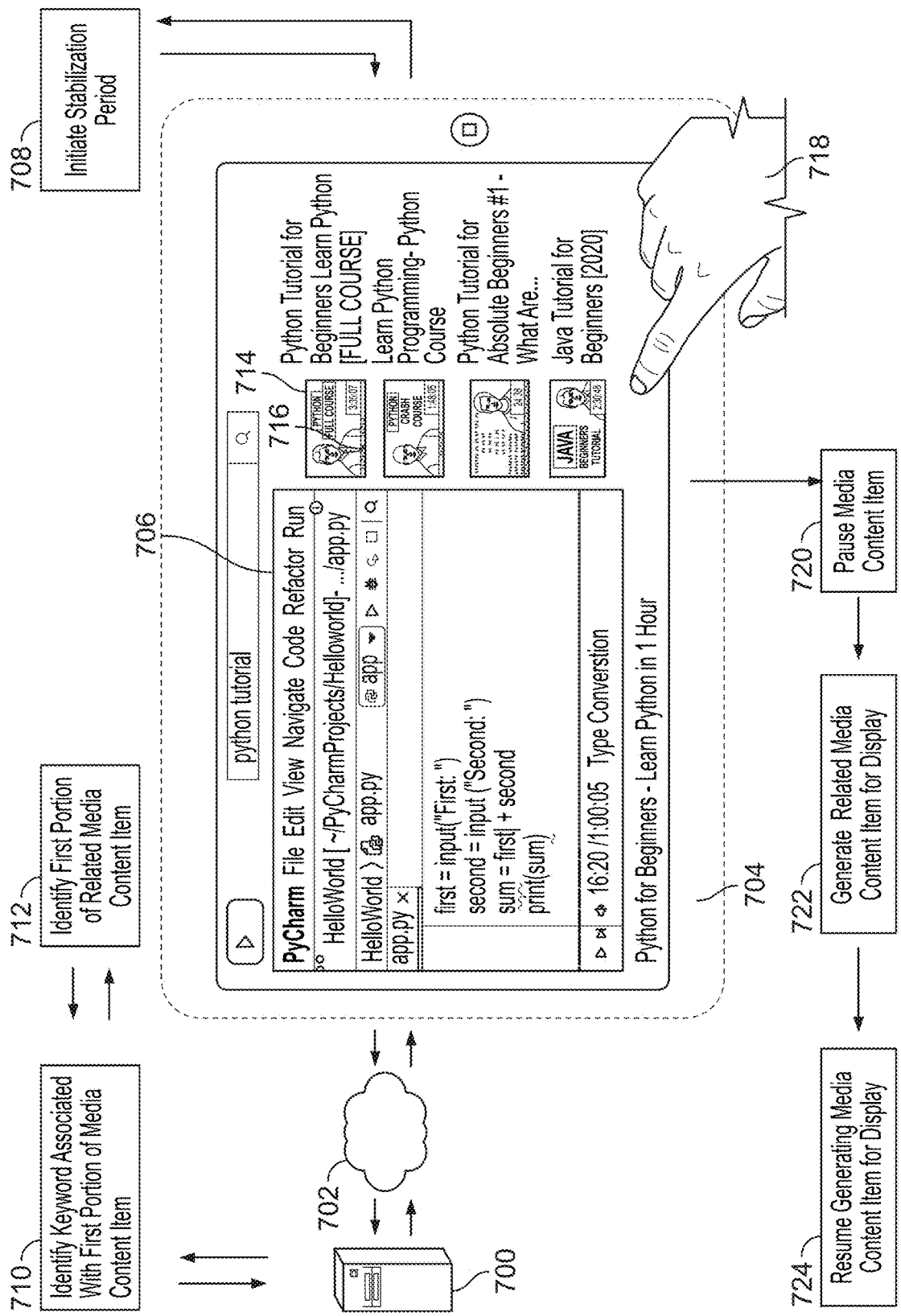
FIG. 7 shows another example environment in which related media content items are dynamically referred to, in accordance with some embodiments of the disclosure.

FIG. 7 shows another example environment in which related media content items are dynamically referred to, in accordance with some embodiments of the disclosure. In a similar manner to the environments discussed above, the environment comprises a server 700, which transmits media content items, via a network 702, to a tablet 704. As before, the tablet 704 runs a media player on a website of a video streaming provider in order to generate the media content item for output and to display 706 the media content item. On receiving the media content item, a stabilization period 708 is initiated at the tablet 704. The stabilization period is a period of time during which no user interface inputs are received at the tablet. The stabilization period may be any suitable time period, for example five seconds long, 30 seconds long and/or a minute long. At the server 700, a keyword associated with a first portion of the media content item is identified 710. The stabilization period enables the first portion of the media content item to be analyzed and a keyword to be associated with the first portion of the media content with greater confidence, because there is consistency in the portion of the media content item that is being transmitted to the tablet 704 due to the lack of, for example, fast play options being input at the tablet 704. A related media content item and a first portion of the related media content item are also identified 712, based on the identified keyword. Steps 710 and 712 may take place during the stabilization period 708. Data is transmitted, from the server 700 to the tablet 704, that enables the tablet to generate an identifier 714 of the related media content item, including an indication 716 of the first portion of the related media content item associated with the identified keyword. The data that is transmitted to the tablet to enable the tablet to generate an identifier of the related media content item may also be generated at the server during the stabilization period 708. A user interface input is received at the tablet via a touch event 718 to select the related media content item. On receiving the touch event 718, the media player running on the tablet 704 pauses 720 the media content item. The first portion of the related media content item is requested from the server 700, transmitted to the tablet 704 via the network 702, and generated for display 722. Once the first portion of the related media content item has been displayed at the tablet 704, the display of the initial media content item resumes 724.

In some examples, a recommender service can observe a viewing stabilization period. In this example, the stabilization period comprises a period of time in which a user interface input is not received at the computing device. In some examples, the period of time may be a period of time that is longer than a threshold amount and/or may be related to the media content item being consumed at the computing device. In this example, the recommender service can initiate a search for related media content items after the viewing stabilization period has been observed at the computing device (i.e., that no user input has been received for a period of time). A technical advantage of this arrangement is that computing resources assigned to tasks such as identifying related media content items and/or indicating segments of the related media content items are only assigned where a user is likely to be engaging with the media content item, rather than browsing through, for example, multiple media content items. With time this reduces the computing resources required.

In some examples, a recommender service can perform look-ahead, or predictive, processing in order to determine whether it needs to update the related content media content items in, for example, a related list and/or highlight different portions of related content media content items, or tags within those related media content items. This can be based, for example, on the stabilization period exceeding a time threshold and/or based on whether any user interface inputs are received relating to, for example, fast-forwarding through a media content item.

Figure 8A:
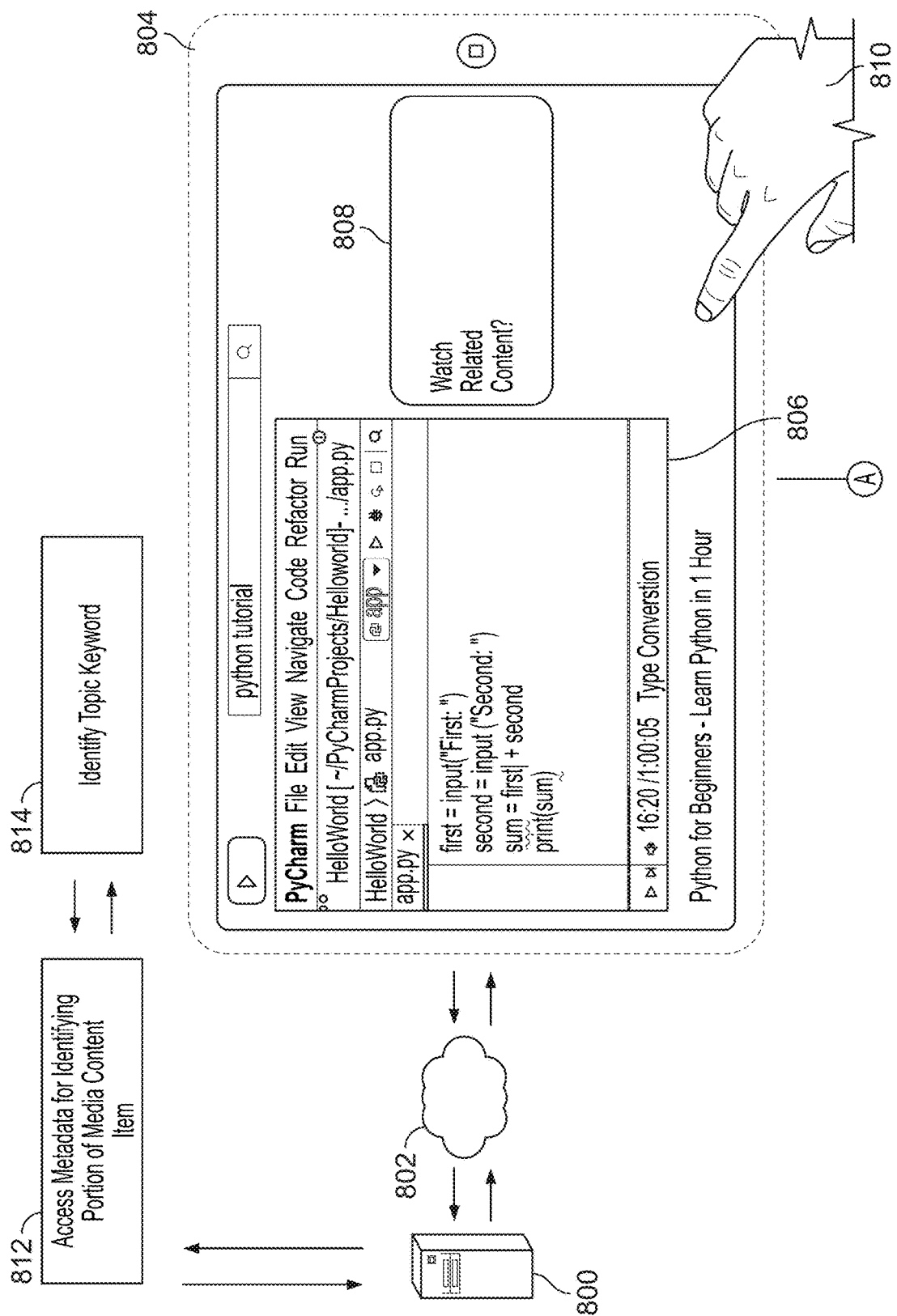
FIG. 8A shows an example environment in which related media content items are identified to in response to receiving user interface inputs, in accordance with some embodiments of the disclosure.

FIG. 8A shows an example environment in which related media content items are identified in response to receiving user interface inputs, in accordance with some embodiments of the disclosure. The environment comprises a first computing device, such as server 800, on which a media content item is stored, a network 802, for transmitting the media content item, and a computing device, such as tablet 804, for receiving the media content item. The network 802 may be the internet and may comprise wired and/or wireless means for transmitting the media content item from the server 800 to the tablet 804. In some examples, the server 800 is an edge server. In some examples, the tablet 804 runs a media player on a website of a video streaming provider in order to generate the media content item for output and to display 806 the media content item. If the computing device is, for example, a smart speaker, and the media content is audio-only media content, then generating the media content for output may comprise generating a signal that causes a speaker to output the audio content. If the computing device is a smart speaker, then the inputs and outputs described herein may take the form of receiving an audible input via a microphone coupled to the computing device and generating audible outputs via a speaker coupled to the computing device. As the tablet 804 displays the media content item, a user interface element, such as a button, or icon, 808 is displayed. The user interface element may have an indication associated with it indicating that it may be used to request a related media content item, and such an indication may read "Watch related content?"

On selecting the user interface element 808 via, for example, a touch event 810, an indication is transmitted from the tablet 804, via the network 802, to the server 800. In other examples, a user interface input may be received at the tablet 804 in any known way, for example via a voice command, or a peripheral device connected to the tablet 804. On receiving the indication, metadata associated with the portion of the media content item that is currently being displayed at the tablet 804 is accessed at the server 800. The metadata is based on a period around the current position within the video, for example the five seconds preceding the play position. In this example, if the video was at a time position of 10:07, the metadata would be associated with the period between 10:02 and 10:07. In another example, the period may start before the current play position and finish after the current play position, for example the ten-second period preceding and following the play position. In this example, if the video was at a time position of 10:07 in a video, the metadata would be associated with the period between 10:02 and 10:12. If the video is accessing content that is not live, a future part of the media content item may be accessed at the server 800. In some examples, if the time period precedes and follows the current play position, it may not be in an even fashion, for example, it could comprise six seconds preceding the play position and three seconds following the current play position. In another example, it could comprise four and half seconds preceding the play position and twenty seconds following the current play position. Determining a topic keyword based on a time period that is shorter than the portion of the media content item that is currently being generated for output reduces the processing resources to identify the topic keyword. A topic keyword associated with the portion of the media content item that is currently being displayed at the tablet 804 is identified 814. Data is transmitted, from the server 800, via the network 802 to the tablet 804, that enables a second user interface 816 to be displayed, requesting input to confirm that the user wishes to watch a related media content item that is related to the identified topic keyword. In some examples, the second user interface element 816 may also comprise an indication of the topic keyword that has been identified. For example, the user interface element 816 may comprise the text "Related to" and one or more of the identified topic keywords. On receiving a subsequent user interface input, such as a touch event 818, a portion of the related media content item that is associated with the topic keyword is identified 820. The media player running on the tablet 804 pauses 822 the media content item. The portion of the related media content item is requested from the server 800, transmitted to the tablet 804 via the network 802, and generated for display 824. Once the first portion of the related media content item has been displayed at the tablet 804, the display of the initial media content item resumes 826. This addresses the issues associated with a system receiving user interface inputs to select multiple media content items, and the user having to skip forwards and backwards through each of the selected individual media content items in an attempt to find a part that gives a more detailed explanation about a topic that they are interested in. The number of additional user interface requests to receive media content items, and additional requests to rewind and/or fast-forward through the selected media content items, is greatly reduced, as a relevant portion of a related media content item is identified, selected, and generated for output. This will greatly reduce (or entirely eliminate) the amount of searching that has to be performed to find further information on a topic, which will greatly reduce (or entirely eliminate) the content that is transmitted that is ultimately discarded due to it not being of relevance. This in turn will reduce the amount of network bandwidth and/or processing resources required when the system described is implemented.

Figure 8B:
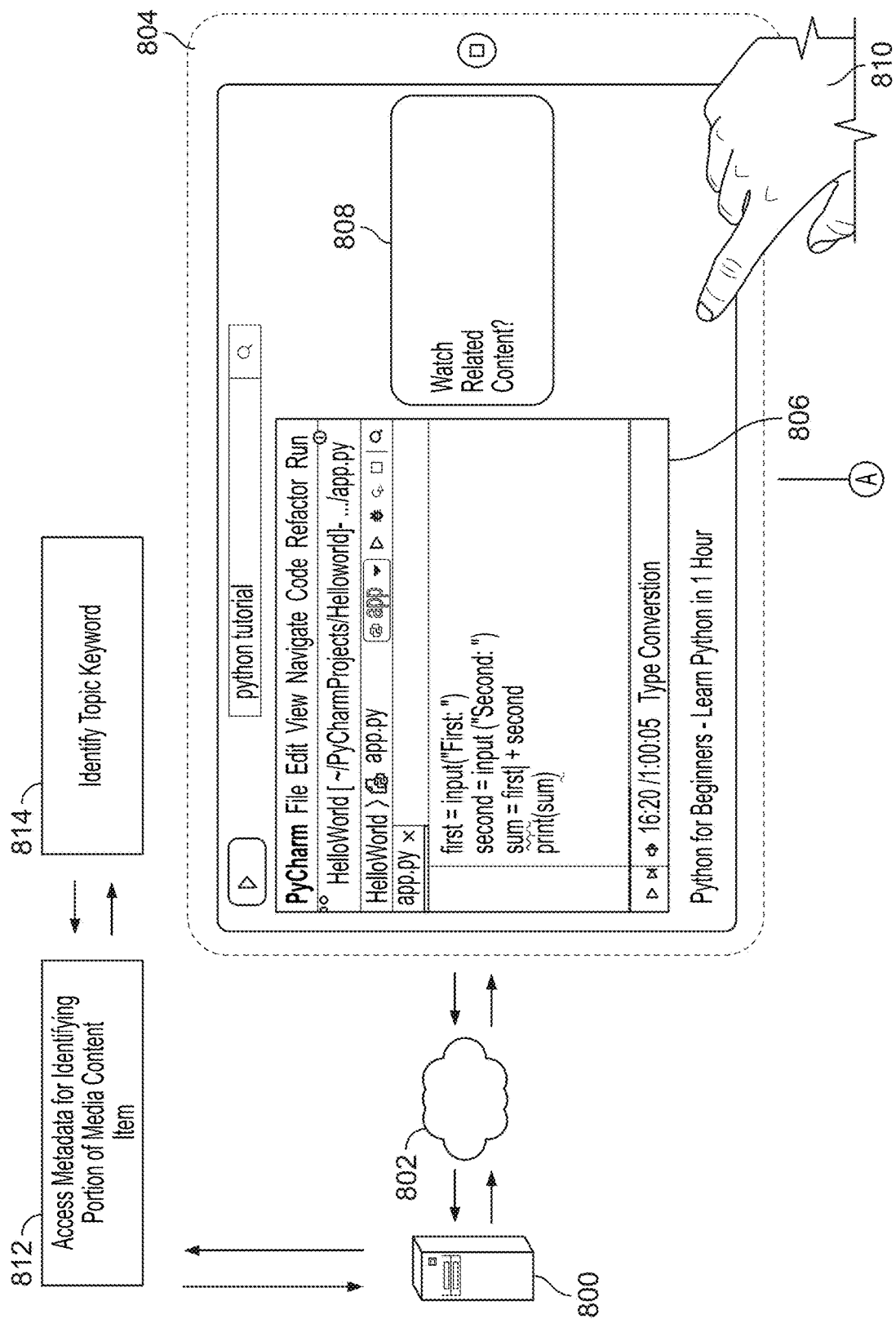
FIG. 8B shows an example environment in which related media content items are identified to in response to receiving user interface inputs, in accordance with some embodiments of the disclosure.

FIG. 8B shows an example environment in which related media content items are identified to in response to receiving user interface inputs, in accordance with some embodiments of the disclosure. The environment of FIG. 8B is the same as that of FIG. 8A; however, the user interface 816*a*, 816*b* is configured to receive multiple user inputs of a first type 818*a*, which causes the user interface to cycle through available related media content items. Different user inputs may comprise, for example, different user gestures, different lengths of user input and/or single or double touch events. On receiving a user interface input of a second type 818*b*, as before, a portion of the related media content item that is associated with the topic keyword is identified 820. The media player running on the tablet 804 pauses 822 the media content item. The portion of the related media content item is requested from the server 800, transmitted to the tablet 804 via the network 802, and generated for display 824. Once the first portion of the related media content item has been displayed at the tablet 804, the display of the initial media content item resumes 826.

Figure 9:
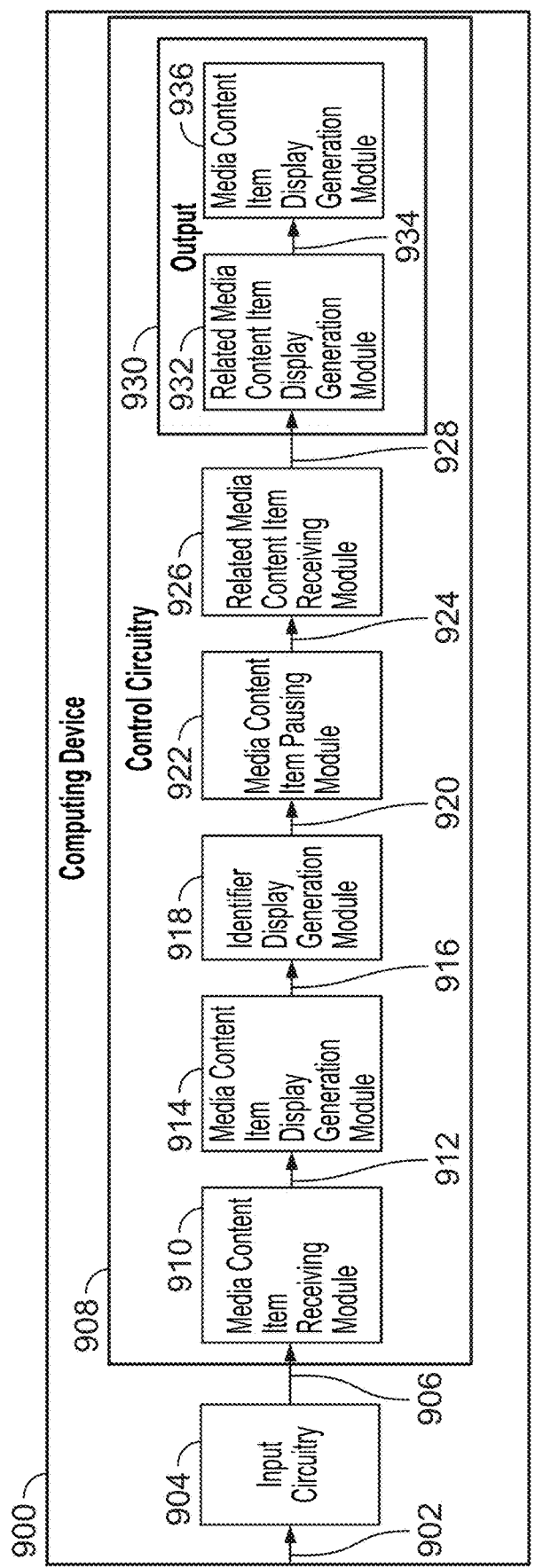
FIG. 9 shows a block diagram representing components of a computing device and data flow therebetween for dynamically referring to related media content items, in accordance with some embodiments of the disclosure.

FIG. 9 shows a block diagram representing components of a computing device and data flow therebetween for dynamically referring to related media content items, in accordance with some embodiments of the disclosure. Computing device 900 (e.g., tablet device 104, 204, 304, 404, 504, 604, 704, 804) as discussed above comprises input circuitry 904, control circuitry 908 and an output module 930. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user interface input 902 is received by the input circuitry 904. The input circuitry 904 is configured to receive user interface inputs related to a computing device. For example, this may be via a touchscreen, keyboard, mouse, microphone, infra-red controller and/or Bluetooth controller of the computing device 900. The input circuitry 904 transmits 906 the user interface input to the control circuitry 908.

The control circuitry 908 comprises a media content item receiving module 910, a media content item display generation module 914, an identifier display generation module 918, a media content item pausing module 922, a related media content item receiving module 926, a related media content item display generation module 932 and a media content item display generation module 936. The user interface input is transmitted 906 to the media content item receiving module 910. At the media content item receiving module 910, a media content item is received from, for example, a streaming server, via the internet. The received media content item is transmitted 912 to the media content item display generation module 914, where the media content item is generated for display. An indication is transmitted 916 from the display generation module 914 to the identifier display generation module 918. At a server, a keyword is identified, and a first portion of a related media content item is identified, as discussed above. Data enabling an identifier of the related media content item and first portion is transmitted, for example, from the server, via the internet, to the computing device 900, where it is received by the identifier display generation module 918 and is used to generate an indication for display. On receiving a user interface input, an indication is transmitted 920 to the media content item pausing module 922, where the media content item is paused. An indication is transmitted 924 to the related media content item receiving module 926, where a related media content item is received from, for example, a streaming server, via the internet. The related media content item is transmitted 928 to the output module 930, where the portion of the related media content item is generated for display by the related media content item display generation module 932. Once the portion of the related media content item has finished, an indication is transmitted 934 to the media content item display generation module 936, where the initial media content item is resumed and generated for output.

In some examples, portions from a media content item related to the currently playing media content item may be linked so that a media player running on a computing device may output different portions of the related media content items in response to a user action or in response to receiving a user interface selection of a specific play mode, such as a "link-mode." Such a link-mode may allow a media player to automatically pause a currently playing media content item, dynamically jump to a portion of a related media content item from the currently playing media content item, and then resume the initial media content item when the portion of related media content item concludes. When enabled, the link mode allows the media player to automatically move between portions of related media content items based on the related factor associated with such segments, as described above.

Figure 10:
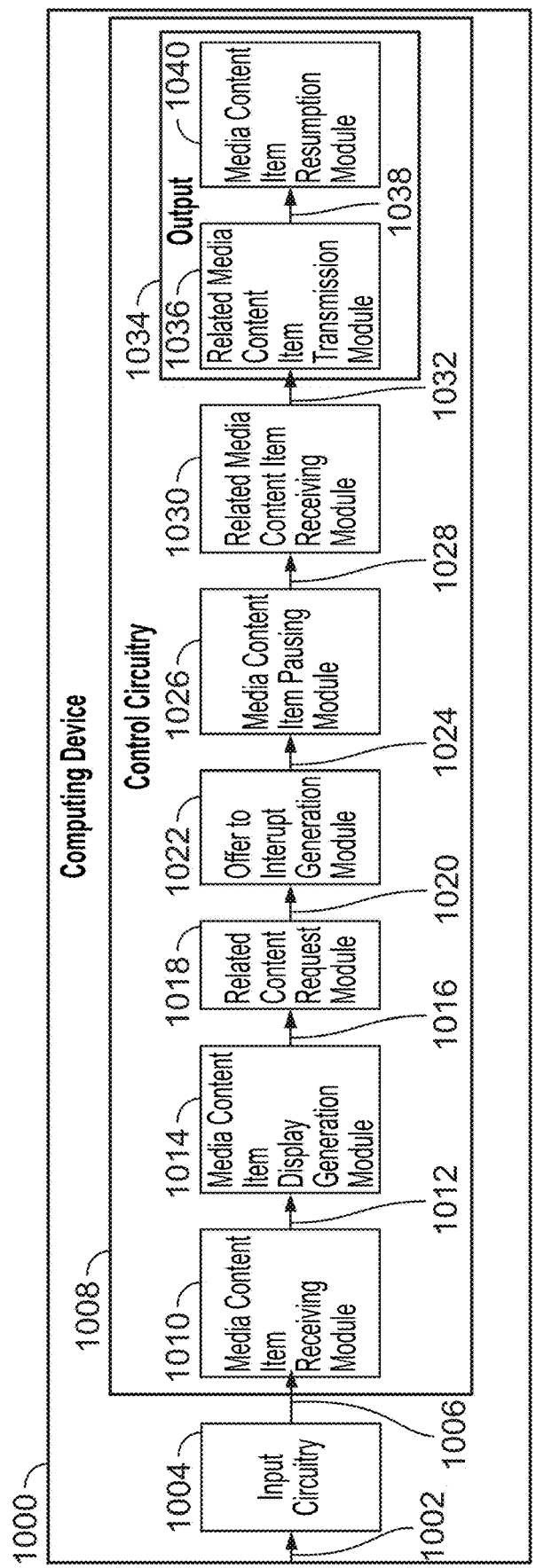
FIG. 10 shows a block diagram representing components of a computing device and data flow therebetween for identifying related media content items in response to receiving user interface inputs, in accordance with some embodiments of the disclosure.

FIG. 10 shows a block diagram representing components of a computing device and data flow therebetween for identifying related media content items in response to receiving a user interface input, in accordance with some embodiments of the disclosure. Computing device 1000 (e.g., tablet device 104, 204, 304, 404, 504, 604, 704, 804) as discussed above comprises input circuitry 1004, control circuitry 1008 and an output module 1034. Control circuitry 1008 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user interface input 1002 is received by the input circuitry 1004. The input circuitry 1004 is configured to receive user interface inputs related to a computing device. For example, this may be via a touchscreen, keyboard, mouse, microphone, infra-red controller and/or Bluetooth controller of the computing device 1000. The input circuitry 1004 transmits 1006 the user interface input to the control circuitry 1008.

The control circuitry 1008 comprises a media content item receiving module 1010, a media content item display generation module 1014, a related content request module 1018, an offer to interrupt generation module 1022, a media content item pausing module 1026, a related media content item receiving module 1030, a related media content item display generation module 1036 and a media content item resumption module 1040. The user interface input is transmitted 1006 to the media content item receiving module 1010. At the media content item receiving module 1010, a media content item is received from, for example, a streaming server, via the internet. The received media content item is transmitted 1012 to the media content item display generation module 1014, where the media content item is generated for display. An indication is transmitted 1016 from the display generation module 1014 to the related content request module 1018. On receiving a user interface input, an indication is transmitted 1020 to the offer to interrupt generation module 1022 and from the computing device 1000, via, for example, the internet, to a server. At the server, metadata is accessed to identify a portion of the media content item, and a topic keyword is identified based on the metadata. An indication is transmitted, from the server, via the internet, to the computing device 1000 and is received by the offer to interrupt generation module 1022, where an offer to interrupt is generated. On receiving a user interface input, an indication is transmitted 1024 to the media content item pausing module 1026, where the media content item is paused. An indication is transmitted 1028 to the related media content item receiving module 1030, where a related media content item is received from, for example, a streaming server, via the internet. The related media content item is transmitted 1032 to the output module 1034, where the portion of the related media content item is generated for display by the related media content item display generation module 1036. Once the portion of the related media content item has finished, an indication is transmitted 1038 to the media content item resumption module 1040, where the media content item is resumed and generated for output.

Figure 11:
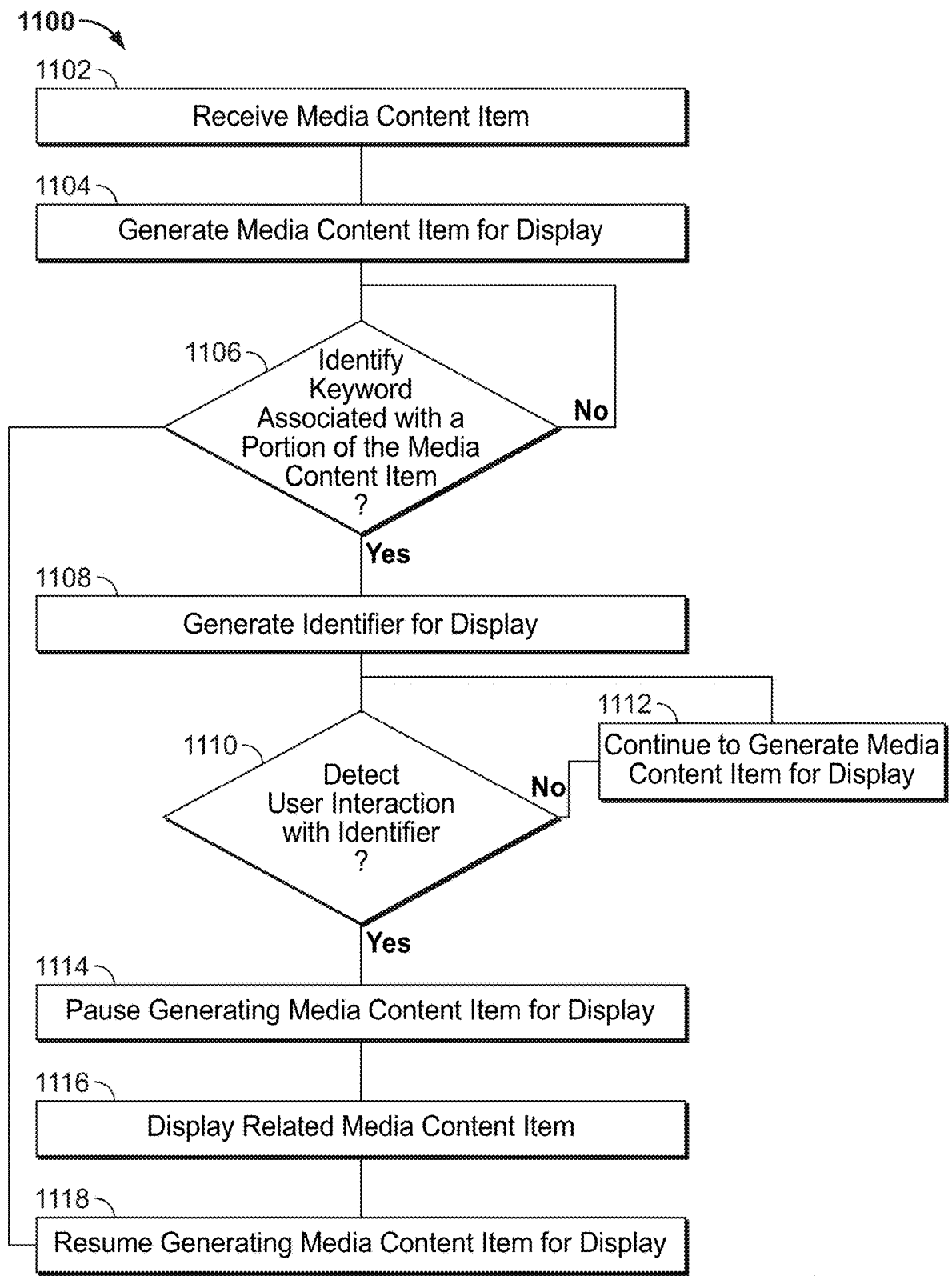
FIG. 11 shows a flowchart of illustrative steps involved in dynamically referring to related media content items, in accordance with some embodiments of the disclosure.

FIG. 11 shows a flowchart of illustrative steps involved in dynamically referring to related media content items, in accordance with some embodiments of the disclosure. Process 1100 may be implemented on any of the aforementioned computing devices (e.g., tablet device 104, 204, 304, 404, 504, 604, 704, 804). In addition, one or more actions of the process 1100 may be incorporated into or combined with one or more actions of any other process or embodiments described herein.

At 1102, a media content item is received at a computing device, and, at 1104, the media content item is generated for display. At 1106, it is identified whether there is a keyword associated with a portion of the media content item. If there is no keyword associated with the portion of the media content item, for example, if there is no metadata associated with the portion of the media content item, then the action may loop until a portion of the media content item that does have a keyword associated with it is identified. If a keyword is associated with the portion of the media content item and is identified, then, at 1108, an identifier is generated for display. At 1110, it is detected whether a user interface input is received for the identifier. If there is no user interaction with the identifier, this action continues to loop while generating the media content item for display 1112. If an interaction with the identifier is detected, then the media content item is paused 1114. At 1116, the related media content item is displayed and, once the related media content item has finished, at 1118, the computing device resumes generating the media content item for display 1118. As the media content item may comprise more than one portion, the action loops back to 1106, where it is identified whether there is a keyword associated with a subsequent portion (or portions) of the media content item.

Figure 12:
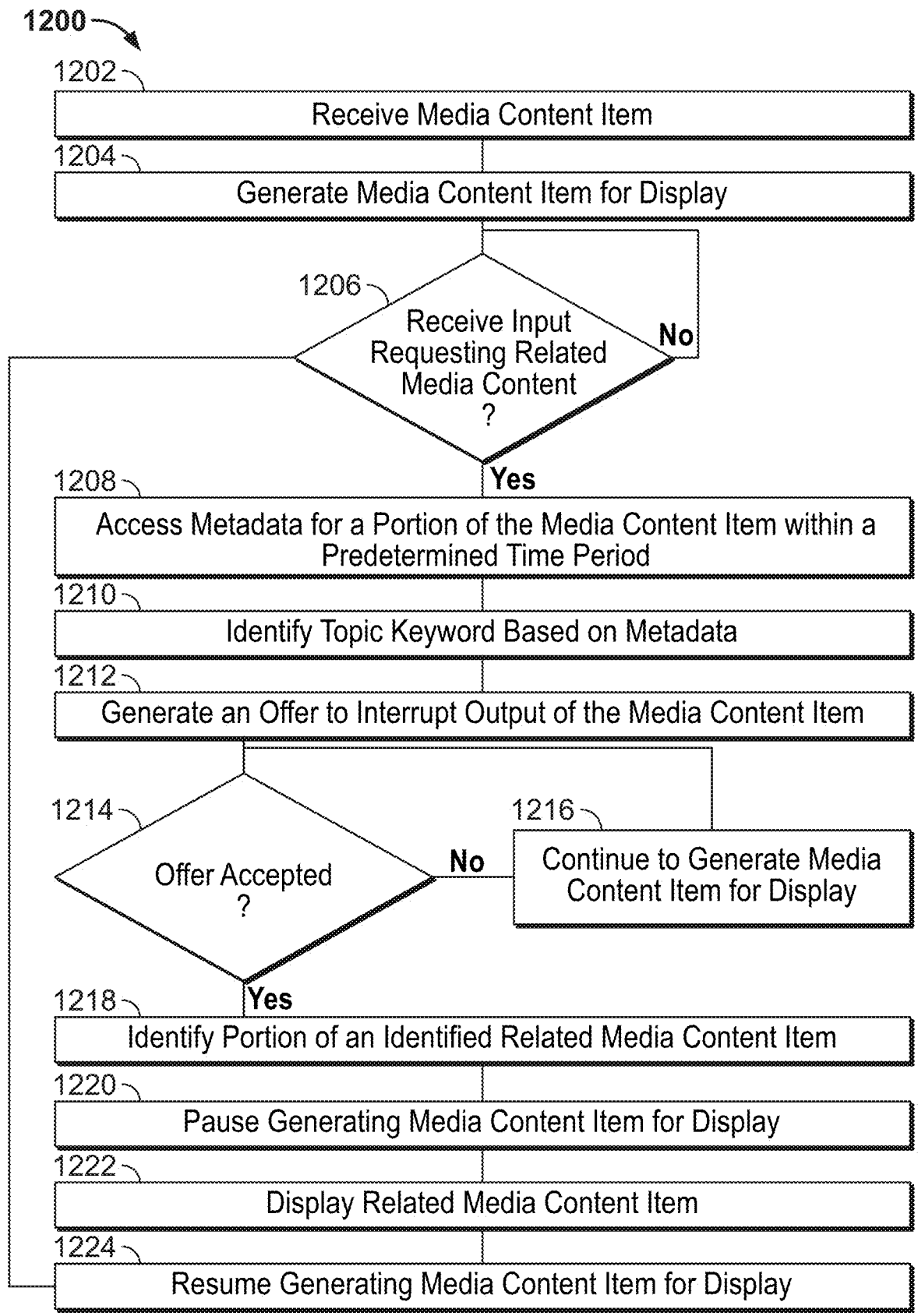
FIG. 12 shows a flowchart of illustrative steps involved in identifying related media content items in response to receiving user interface inputs, in accordance with some embodiments of the disclosure.

FIG. 12 shows a flowchart of illustrative steps involved in identifying related media content items in response to receiving user interface inputs, in accordance with some embodiments of the disclosure. Process 1200 may be implemented on any of the aforementioned computing devices (e.g., tablet device 104, 204, 304, 404, 504, 604, 704, 804). In addition, one or more actions of the process 1200 may be incorporated into or combined with one or more actions of any other process or embodiments described herein.

At 1202, a media content item is received at a computing device, and, at 1204, the media content item is generated for display. At 1206, it is identified whether an input requesting related media content has been received. If no input is received, then the action may loop until an input is received. If an input is received, then, at 1208, metadata is accessed for a portion of the media content item within a predetermined time period. A topic keyword is identified based on the metadata 1210, and an offer to interrupt output of the media content item is generated 1212. At 1214, it is identified whether the offer to interrupt has been accepted. If there is no interaction with the offer, this action continues to loop while generating the media content item for display 1216. If an interaction with the offer is detected, then a portion of the identified related media content item is identified 1218, and the media content item is paused 1220. At 1222, the related media content item is displayed and, once the related media content item has finished, at 1224, the computing device resumes generating the media content item for display 1224. As the media content item may comprise more than one portion, the action loops back to 1206, where it is identified whether an input requesting related media content has been received.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    transmitting a first segment of a first media content item for output at a computing device;
    causing the computing device to generate the first segment of the first media content item for display and to initiate a stabilization period, wherein user input with respect to trick-play functionality is disabled during the stabilization period;
    receiving a user interface input requesting media content related to the first segment of the first media content item;
    in response to the receipt of the user interface input requesting related media content:
        identifying a play position at which the user interface input requesting related media content was received;
        identifying that the first media content item is not live;
        in response to the identification that the first media content item is not live:
            accessing a second segment of the first media content item that has not been received at the computing device, wherein the second segment starts after the play position;
            accessing metadata for a portion of the first media content item within a predetermined time period away from the play position of the first media content item, wherein the predetermined time period covers the first segment and the second segment of the first media content item and is shorter than the length of the first media content item;
            identifying, during the stabilization period, a topic keyword based on the accessed metadata;
            generating for display a prompt, wherein the prompt comprises a user interface element configured to:
                interrupt output of the first media content item to output content related to the topic keyword; and
                return to the first media content item subsequent to output of the content related to the topic keyword;
    in response to receiving an input associated with the user interface element:
        identifying a portion of an identified related media content item that is associated with the identified topic keyword;
        pausing the first media content item being generated for display;
        transmitting, for display, the portion of the identified related media content item that is associated with the identified topic keyword; and
        causing the computing device to resume generating for display the first media content item.

2. The method of claim 1, wherein a start time of the portion of the first media content item occurs before the play position of the first media content item.

3. The method of claim 1, wherein a start time of the portion of the first media content item occurs before the play position of the first media content item and a finish time of the portion of the first media content item occurs after the play position of the first media content item.

4. The method of claim 1, wherein the method further comprises generating a manifest file in response to receiving acceptance of the prompt, wherein the manifest file indicates an association between the first media content item and the identified related media content item.

5. The method of claim 1, wherein identifying the topic keyword further comprises transcribing at least a portion of audio associated with the first media content item.

6. The method of claim 1, further comprising:
    identifying a tag associated with the first media content item; and wherein:
    the identifying the related media content item further comprises identifying a related media content item comprising a portion associated with the tag.

7. The method of claim 1, further comprising determining an intent of the received user interface input, and the prompt that is generated for display is based on the determined intent.

8. The method of claim 1, wherein:
    the method further comprises identifying a portion of the first media content item, wherein the portion is of a predetermined length, and a start time of the portion is based on a play position of the first media content item; and
    accessing the metadata further comprises accessing metadata for the identified portion of the first media content item, wherein the accessed metadata describes the content of the identified portion.

9. A system comprising:
    control circuitry configured to:
        receive a first segment of a first media content item for output at a computing device; and cause the computing device to generate the first segment of the first media content item for display and to initiate a stabilization period, wherein user input with respect to trick-play functionality is disabled during the stabilization period;

input circuitry configured to:
receive a user interface input requesting media content related to the first segment of the first media content item;

the control circuitry further configured to:
in response to the receipt of the user interface input requesting related media content:
identify a play position at which the user interface input requesting related media content was received;
identify that the first media content item is not live;
in response to the identification that the first media content item is not live:
access a second segment of the first media content item that has not been received at the computing device, wherein the second segment starts after the play position;
access metadata for a portion of the first media content item within a predetermined time period away from the play position of the first media content item, wherein the predetermined time period covers the first segment and the second segment of the first media content item and is shorter than the length of the first media content item;
identify, during the stabilization period, a topic keyword based on the accessed metadata;
generate for display a prompt, wherein the prompt comprises a user interface element configured to:
interrupt output of the first media content item to output content related to the topic keyword; and
return to the first media content item subsequent to output of the content related to the topic keyword;
in response to receiving an input associated with the user interface element:
identify a portion of an identified related media content item that is associated with the identified topic keyword;
pause the first media content item being generated for display;
transmit, for display, the portion of the identified related media content item that is associated with the identified topic keyword; and
cause the computing device to resume generating for display the first media content item.

10. The system of claim 9, wherein a start time of the portion of the first media content item occurs before the play position of the first media content item.

11. The system of claim 9, wherein a start time of the portion of the first media content item occurs before the play position of the first media content item and a finish time of the portion of the first media content item occurs after the play position of the first media content item.

12. The system of claim 9, wherein the control circuitry is further configured to generate a manifest file in response to receiving acceptance of the prompt, wherein the manifest file indicates an association between the first media content item and the identified related media content item.

13. The system of claim 9, wherein the control circuitry configured to identify the topic keyword is further configured to transcribe at least a portion of audio associated with the first portion of the first media content item.

14. The system of claim 9, wherein the control circuitry is further configured to:
identify a tag associated with the first media content item; and wherein:
the control circuitry configured to identify the related media content item is further configured to identify a related media content item comprising a portion associated with the tag.

15. The system of claim 9, wherein the control circuitry is further configured to determine an intent of the received user interface input, and the control circuitry configured to generate the prompt for display is further configured to generate the prompt for display based on the determined intent.

16. The system of claim 9, wherein:
the control circuitry is further configured to identify a portion of the first media content item, wherein the portion is of a predetermined length, and a start time of the portion is based on a play position of the first media content item; and
the control circuitry configured to access the metadata is configured to access the metadata by accessing metadata for the identified portion of the first media content item, wherein the accessed metadata describes the content of the identified portion.

17. A non-transitory, computer-readable medium having non-transitory, computer-readable instructions encoded thereon that, when executed by control circuitry, cause the control circuitry to:
transmit a first segment of a first media content item for output at a computing device;
cause the computing device to generate the first segment of the first media content item for display and to initiate a stabilization period, wherein user input with respect to trick-play functionality is disabled during the stabilization period;
receive a user interface input requesting media content related to the first segment of the first media content item;
in response to the receipt of the user interface input requesting related media content:
identify a play position at which the user interface input requesting related media content was received;
identify that the first media content item is not live;
in response to the identification that the first media content item is not live:
access a second segment of the first media content item that has not been received at the computing device, wherein the second segment starts after the play position;
access metadata for a portion of the first media content item within a predetermined time period away from the play position of the first media content item, wherein the predetermined time period covers the first segment and the second segment of the first media content item and is shorter than the length of the first media content item;
identify, during the stabilization period, a topic keyword based on the accessed metadata;
generate for display a prompt, wherein the prompt comprises a user interface element configured to:
interrupt output of the first media content item to output content related to the topic keyword; and
return to the first media content item subsequent to output of the content related to the topic keyword;

in response to receiving an input associated with the user interface element:
- identify a portion of an identified related media content item that is associated with the identified topic keyword;
- pause the first media content item being generated for display;
- transmit, for display, the portion of the identified related media content item that is associated with the identified topic keyword; and
- cause the computing device to resume generating for display the first media content item.

18. The non-transitory, computer-readable medium of claim 17, wherein a start time of the portion of the first media content item occurs before the play position of the first media content item.

\* \* \* \* \*